US012794227B2

(12) United States Patent
Long et al.

(10) Patent No.: US 12,794,227 B2
(45) Date of Patent: Nov. 10, 2026

(54) POWER MANAGER WITH RECONFIGURABLE POWER CONVERTING CIRCUITS

(71) Applicant: GALVION SOLDIER POWER, LLC, Portsmouth, NH (US)

(72) Inventors: David N. Long, Northborough, MA (US); Nicholas J. Piela, Wilbraham, MA (US); David J. Butler, Rochester, MN (US)

(73) Assignee: GALVION LTD., Portsmouth, NH (US)

( * ) Notice: Subject to any disclaimer, the term of this patent is extended or adjusted under 35 U.S.C. 154(b) by 0 days.

(21) Appl. No.: 18/777,205

(22) Filed: Jul. 18, 2024

(65) Prior Publication Data

US 2024/0372361 A1 Nov. 7, 2024

Related U.S. Application Data

(63) Continuation of application No. 17/559,771, filed on Dec. 22, 2021, now Pat. No. 12,068,600, which is a (Continued)

(51) Int. Cl.
*H02J 1/102* (2026.01)
*G06F 1/26* (2006.01)
(Continued)

(52) U.S. Cl.
CPC .............. *H02J 1/102* (2013.01); *G06F 1/263* (2013.01); *G06F 1/266* (2013.01);
(Continued)

(58) Field of Classification Search
CPC ...... H02J 1/102; H02J 1/08; H02J 7/56; H02J 7/865; H02J 1/082; H02J 7/34;
(Continued)

(56) References Cited

U.S. PATENT DOCUMENTS 2,468,697 A 4/1949 Wiley
2,814,043 A 11/1957 Alesi
(Continued)

FOREIGN PATENT DOCUMENTS

CN 1434282 A1 8/2003
CN 101488192 B 6/2012
(Continued)

OTHER PUBLICATIONS

Abu-Qahouq, Jaber A. et al., “Control Scheme for high-efficiency high-performance two-stage power converters”, 2009, Twenty-Fourth Annual IEEE Applied Power Electronics Conference and Exposition, 7 pages.
(Continued)

*Primary Examiner* — Daniel Cavallari
(74) *Attorney, Agent, or Firm* — DAY PITNEY LLP; George N. Chaclas; Jacob J. Golan

(57) ABSTRACT

A reconfigurable power circuit (400) includes a single one-way DC to DC power converter (220, 221). The reconfigurable power circuit is configurable by a digital data processor as one of three different power channels (230, 232, and 234). Power channel (230) provides output power conversion. Power channel (232) provides input power conversion. Power channel (234) provides bi-directional power exchange without power conversion.

20 Claims, 12 Drawing Sheets

Related U.S. Application Data continuation of application No. 17/081,716, filed on Oct. 27, 2020, now Pat. No. 11,258,366, which is a continuation of application No. 16/415,336, filed on May 17, 2019, now Pat. No. 10,848,067, which is a continuation-in-part of application No. 15/774,380, filed as application No. PCT/US2016/058922 on Oct. 26, 2016, now Pat. No. 11,108,230.

(60) Provisional application No. 62/257,995, filed on Nov. 20, 2015.

(51) Int. Cl.

| | |
|---|---|
| ***G06F 13/40*** | (2006.01) |
| ***H02J 1/08*** | (2006.01) |
| ***H02J 7/00*** | (2006.01) |
| ***H02J 7/56*** | (2026.01) |
| ***H02M 3/04*** | (2006.01) |
| ***H02M 3/28*** | (2006.01) |
| *H02J 1/082* | (2026.01) |

(52) U.S. Cl.
CPC ............ *G06F 13/4022* (2013.01); *H02J 1/08* (2013.01); *H02J 7/56* (2026.01); *H02J 7/865* (2026.01); *H02M 3/04* (2013.01); *H02M 3/285* (2013.01); *H02J 1/082* (2020.01)

(58) Field of Classification Search
CPC ...... G06F 1/263; G06F 1/266; G06F 13/4022; H02M 3/04; H02M 3/285; H02M 1/10; Y02D 10/00
See application file for complete search history.

(56) References Cited

U.S. PATENT DOCUMENTS

| | | | |
|---|---|---|---|
| 3,154,788 | A | 11/1964 | Simpson |
| 3,264,392 | A | 8/1966 | Taplin |
| 3,280,246 | A | 10/1966 | Lawson et al. |
| 3,383,705 | A | 5/1968 | Raschke |
| 3,758,889 | A | 9/1973 | Erb |
| 3,967,050 | A | 6/1976 | Makihara et al. |
| 4,044,268 | A | 8/1977 | Hammel et al. |
| 4,263,679 | A | 4/1981 | Erlendson |
| 4,449,787 | A | 5/1984 | Burbo et al. |
| 4,589,075 | A | 5/1986 | Buennagel |
| 4,810,832 | A | 3/1989 | Spinner et al. |
| 4,888,831 | A | 12/1989 | Oleson |
| 4,910,100 | A | 3/1990 | Nakanishi et al. |
| 4,931,947 | A | 6/1990 | Werth et al. |
| 4,942,628 | A | 7/1990 | Freund |
| 4,943,222 | A | 7/1990 | Nathoo |
| 5,042,093 | A | 8/1991 | Legendre |
| 5,153,496 | A | 10/1992 | Laforge |
| 5,258,244 | A | 11/1993 | Hall et al. |
| 5,315,718 | A | 5/1994 | Barson et al. |
| 5,321,349 | A | 6/1994 | Chang |
| 5,416,922 | A | 5/1995 | Horvat et al. |
| 5,551,094 | A | 9/1996 | Navone |
| 5,570,002 | A | 10/1996 | Castleman |
| 5,572,749 | A | 11/1996 | Ogden |
| 5,581,819 | A | 12/1996 | Garneau |
| 5,601,852 | A | 2/1997 | Seemann |
| 5,650,240 | A | 7/1997 | Rogers |
| 5,675,754 | A | 10/1997 | King et al. |
| 5,683,831 | A | 11/1997 | Baril et al. |
| 5,754,445 | A | 5/1998 | Jouper et al. |
| 5,794,272 | A | 8/1998 | Workman et al. |
| 5,831,198 | A | 11/1998 | Turley et al. |
| 5,898,291 | A | 4/1999 | Hall |
| 5,898,949 | A | 5/1999 | Barthold et al. |
| 5,903,764 | A | 5/1999 | Shyr et al. |
| 5,914,585 | A | 6/1999 | Grabon |
| 5,945,806 | A | 8/1999 | Faulk |
| 5,977,656 | A | 11/1999 | John |
| 5,986,437 | A | 11/1999 | Lee |
| 6,014,013 | A | 1/2000 | Suppanz et al. |
| 6,025,696 | A | 2/2000 | Lenhart et al. |
| 6,032,297 | A | 3/2000 | Barthold et al. |
| 6,046,514 | A | 4/2000 | Rouillard et al. |
| 6,081,931 | A | 7/2000 | Burns et al. |
| 6,087,035 | A | 7/2000 | Rogers et al. |
| 6,136,228 | A | 10/2000 | Hirai et al. |
| 6,137,280 | A | 10/2000 | Ackermann et al. |
| 6,198,642 | B1 | 3/2001 | Kociecki |
| 6,221,522 | B1 | 4/2001 | Zafred et al. |
| 6,223,077 | B1 | 4/2001 | Schweizer et al. |
| 6,246,215 | B1 | 6/2001 | Popescu-Stanesti |
| 6,265,846 | B1 | 7/2001 | Flechsig et al. |
| 6,271,646 | B1 | 8/2001 | Evers et al. |
| 6,292,952 | B1 | 9/2001 | Watters et al. |
| 6,366,061 | B1 | 4/2002 | Carley et al. |
| 6,366,333 | B1 | 4/2002 | Yamamoto et al. |
| 6,370,050 | B1 | 4/2002 | Peng et al. |
| 6,376,938 | B1 | 4/2002 | Williams |
| 6,396,391 | B1 | 5/2002 | Binder |
| 6,459,175 | B1 | 10/2002 | Potega |
| 6,476,581 | B2 | 11/2002 | Lew |
| 6,485,852 | B1 | 11/2002 | Miller et al. |
| 6,492,050 | B1 | 12/2002 | Sammes |
| 6,530,026 | B1 | 3/2003 | Bard |
| 6,539,484 | B1 | 3/2003 | Cruz |
| 6,541,879 | B1 | 4/2003 | Wright |
| 6,608,463 | B1 | 8/2003 | Kelly et al. |
| 6,627,339 | B2 | 9/2003 | Haltiner, Jr. |
| 6,628,011 | B2 | 9/2003 | Droppo et al. |
| 6,633,823 | B2 | 10/2003 | Bartone et al. |
| 6,690,585 | B2 | 2/2004 | Betts-Lacroix |
| 6,694,270 | B2 | 2/2004 | Hart |
| 6,703,722 | B2 | 3/2004 | Christensen |
| 6,707,284 | B2 | 3/2004 | Lanni |
| 6,828,695 | B1 | 12/2004 | Hansen |
| 6,831,848 | B2 | 12/2004 | Lanni |
| 6,925,361 | B1 | 8/2005 | Sinnock |
| 6,968,575 | B2 | 11/2005 | Durocher |
| 6,977,921 | B1 | 12/2005 | Dolan |
| 6,981,863 | B2 | 1/2006 | Renault et al. |
| 6,985,799 | B2 | 1/2006 | Zalesski |
| 7,001,682 | B2 | 2/2006 | Haltiner |
| 7,002,265 | B2 | 2/2006 | Potega |
| 7,036,028 | B2 | 4/2006 | Zalesski |
| 7,071,660 | B2 | 7/2006 | Xu et al. |
| 7,076,592 | B1 | 7/2006 | Ykema |
| 7,105,946 | B2 | 9/2006 | Akiyama et al. |
| 7,124,449 | B2 | 10/2006 | Sutter et al. |
| 7,166,937 | B2 | 1/2007 | Wilson et al. |
| 7,178,175 | B2 | 2/2007 | Rogers et al. |
| 7,188,003 | B2 | 3/2007 | Ransom et al. |
| 7,203,849 | B2 | 4/2007 | Dove |
| 7,212,407 | B2 | 5/2007 | Beihoff et al. |
| 7,226,681 | B2 | 6/2007 | Florence et al. |
| 7,235,321 | B2 | 6/2007 | Sarkar et al. |
| 7,243,243 | B2 | 7/2007 | Gedeon |
| 7,256,516 | B2 | 8/2007 | Buchanan et al. |
| 7,274,175 | B2 | 9/2007 | Manolescu |
| 7,385,373 | B2 | 6/2008 | Doruk et al. |
| 7,388,349 | B2 | 6/2008 | Elder et al. |
| 7,408,794 | B2 | 8/2008 | Su |
| 7,436,687 | B2 | 10/2008 | Patel |
| 7,444,445 | B2 | 10/2008 | Kubo et al. |
| 7,506,179 | B2 | 3/2009 | Templeton |
| 7,531,915 | B2 | 5/2009 | Wang et al. |
| 7,541,693 | B2 | 6/2009 | Huang et al. |
| 7,590,684 | B2 | 9/2009 | Herrmann |
| 7,595,815 | B2 | 9/2009 | Donovan et al. |
| 7,618,260 | B2 | 11/2009 | Daniel et al. |
| 7,646,107 | B2 | 1/2010 | Smith |
| 7,674,543 | B2 | 3/2010 | Chiang et al. |
| 7,675,758 | B2 | 3/2010 | Artusi et al. |
| 7,683,575 | B2 | 3/2010 | Berdichevsky et al. |
| 7,701,082 | B2 | 4/2010 | Lazarovich et al. |
| 7,770,239 | B1 | 8/2010 | Goldman et al. |

(56) References Cited

U.S. PATENT DOCUMENTS

| | | | |
|---|---|---|---|
| 7,778,940 | B2 | 8/2010 | Mazzarella |
| 7,808,122 | B2 | 10/2010 | Menas et al. |
| 7,814,348 | B2 | 10/2010 | Krajcovic et al. |
| 7,834,479 | B2 | 11/2010 | Capp et al. |
| 7,838,142 | B2 | 11/2010 | Scheucher |
| 7,844,370 | B2 | 11/2010 | Pollack et al. |
| 7,847,532 | B2 | 12/2010 | Potter et al. |
| 7,849,341 | B2 | 12/2010 | Sugiyama |
| 7,855,528 | B2 | 12/2010 | Lee |
| 7,873,844 | B2 | 1/2011 | Diab et al. |
| 7,928,720 | B2 | 4/2011 | Wang |
| D640,192 | S | 6/2011 | Robinson et al. |
| 8,020,220 | B2 | 9/2011 | Mcelroy et al. |
| 8,073,554 | B2 | 12/2011 | Vezza et al. |
| 8,086,281 | B2 | 12/2011 | Rabu et al. |
| 8,103,892 | B2 | 1/2012 | Krajcovic |
| 8,106,537 | B2 | 1/2012 | Casey et al. |
| 8,138,631 | B2 | 3/2012 | Allen et al. |
| 8,140,194 | B2 | 3/2012 | Iino et al. |
| 8,164,217 | B1 | 4/2012 | Miller |
| 8,178,999 | B2 | 5/2012 | Burger et al. |
| 8,193,661 | B2 | 6/2012 | Jagota et al. |
| 8,255,090 | B2 | 8/2012 | Frader-Thompson et al. |
| 8,279,642 | B2 | 10/2012 | Chapman et al. |
| 8,294,307 | B2 | 10/2012 | Tsai |
| 8,304,122 | B2 | 11/2012 | Poshusta et al. |
| 8,312,299 | B2 | 11/2012 | Tremel et al. |
| 8,315,745 | B2 | 11/2012 | Creed |
| 8,333,619 | B2 | 12/2012 | Kondo et al. |
| 8,352,758 | B2 | 1/2013 | Atkins et al. |
| 8,353,066 | B2 | 1/2013 | Rogers et al. |
| 8,363,797 | B2 | 1/2013 | Binder |
| 8,375,229 | B2 | 2/2013 | Saeki |
| 8,401,709 | B2 | 3/2013 | Cherian et al. |
| 8,425,240 | B2 | 4/2013 | Lee et al. |
| 8,438,619 | B2 | 5/2013 | Olson |
| 8,447,435 | B1 | 5/2013 | Miller et al. |
| 8,455,794 | B2 | 6/2013 | Vogel |
| 8,462,799 | B2 | 6/2013 | Molsberry et al. |
| 8,466,662 | B2 | 6/2013 | Nania et al. |
| 8,476,581 | B2 | 7/2013 | Babayoff et al. |
| 8,494,479 | B2 | 7/2013 | Budampati et al. |
| 8,508,166 | B2 | 8/2013 | Marcinkiewicz et al. |
| 8,548,607 | B1 | 10/2013 | Belz et al. |
| 8,599,588 | B2 | 12/2013 | Adest et al. |
| 8,611,107 | B2 | 12/2013 | Chapman et al. |
| 8,614,023 | B2 | 12/2013 | Poshusta et al. |
| 8,633,619 | B2 | 1/2014 | Robinson et al. |
| 8,636,011 | B2 | 1/2014 | Strickland et al. |
| 8,638,011 | B2 | 1/2014 | Robinson et al. |
| 8,643,326 | B2 | 2/2014 | Campanella et al. |
| 8,648,492 | B2 | 2/2014 | Craig et al. |
| 8,649,914 | B2 | 2/2014 | Miller et al. |
| 8,682,496 | B2 | 3/2014 | Schweitzer et al. |
| D706,711 | S | 6/2014 | Robinson et al. |
| 8,739,318 | B2 | 6/2014 | Durocher |
| 8,763,077 | B2 | 6/2014 | Oberheide et al. |
| 8,775,828 | B2 | 7/2014 | Coonan et al. |
| 8,775,846 | B2 | 7/2014 | Robinson et al. |
| 8,781,640 | B1 | 7/2014 | Miller |
| 8,796,888 | B2 | 8/2014 | Rice et al. |
| 8,826,463 | B2 | 9/2014 | Teetzel et al. |
| 8,829,713 | B2 | 9/2014 | Ishigaki et al. |
| 8,849,471 | B2 | 9/2014 | Daniel et al. |
| 8,853,891 | B2 | 10/2014 | Soar |
| 8,854,389 | B2 | 10/2014 | Wong et al. |
| 8,890,474 | B2 | 11/2014 | Kim et al. |
| 8,901,774 | B2 | 12/2014 | Yan et al. |
| 8,913,406 | B2 | 12/2014 | Guthrie et al. |
| 8,970,176 | B2 | 3/2015 | Ballatine et al. |
| 8,984,665 | B2 | 3/2015 | Celona et al. |
| 9,041,349 | B2 | 5/2015 | Bemmel et al. |
| 9,043,617 | B2 | 5/2015 | Miki |
| 9,093,862 | B2 | 7/2015 | Dennis et al. |
| 9,101,175 | B2 | 8/2015 | Redpath et al. |
| 9,142,957 | B2 | 9/2015 | Malmberg et al. |
| 9,158,294 | B2 | 10/2015 | Carralero et al. |
| 9,190,673 | B2 | 11/2015 | Venkataraman et al. |
| 9,203,302 | B2 | 12/2015 | Kelly |
| 9,207,735 | B2 | 12/2015 | Khaitan et al. |
| 9,216,523 | B2 | 12/2015 | Monforte, II et al. |
| 9,247,779 | B1 | 2/2016 | Aloumanis et al. |
| 9,307,803 | B1 | 4/2016 | Folgar |
| 9,337,943 | B2 | 5/2016 | Mosebrook et al. |
| 9,343,758 | B2 | 5/2016 | Poshusta et al. |
| 9,356,173 | B2 | 5/2016 | Okandan et al. |
| 9,364,975 | B2 | 6/2016 | Preisler et al. |
| 9,450,274 | B2 | 9/2016 | Vo et al. |
| 9,452,475 | B2 | 9/2016 | Armstrong et al. |
| 9,502,894 | B2 | 11/2016 | Holmberg et al. |
| 9,560,049 | B2 | 1/2017 | Srinivasan |
| 9,634,491 | B2 | 4/2017 | Robinson et al. |
| 9,698,596 | B2 | 7/2017 | Sauer et al. |
| 9,722,435 | B2 | 8/2017 | Park |
| 9,807,319 | B2 | 10/2017 | Teich et al. |
| 10,063,594 | B2 | 8/2018 | Winn et al. |
| 10,079,488 | B2 | 9/2018 | Challancin |
| 10,165,817 | B2 | 1/2019 | Redpath et al. |
| 10,250,134 | B2 | 4/2019 | Long et al. |
| 10,324,290 | B2 | 6/2019 | Weller et al. |
| 10,333,315 | B2 | 6/2019 | Robinson et al. |
| 10,343,552 | B2 | 7/2019 | Ashcraft et al. |
| 10,448,695 | B2 | 10/2019 | Folgar |
| D900,407 | S | 10/2020 | Hanudel et al. |
| 10,928,163 | B2 | 2/2021 | Zimmer |
| 11,353,159 | B2 | 6/2022 | Roth |
| 2002/0135492 | A1 | 9/2002 | Reagan et al. |
| 2003/0006905 | A1 | 1/2003 | Shieh et al. |
| 2003/0054215 | A1 | 3/2003 | Doshi et al. |
| 2003/0085621 | A1 | 5/2003 | Potega |
| 2003/0234729 | A1 | 12/2003 | Shen |
| 2004/0061380 | A1 | 4/2004 | Hann et al. |
| 2004/0125618 | A1 | 7/2004 | De Rooij et al. |
| 2004/0239287 | A1 | 12/2004 | Batts |
| 2005/0037241 | A1 | 2/2005 | Schneider et al. |
| 2005/0062019 | A1 | 3/2005 | Yukinobu |
| 2005/0102043 | A1 | 5/2005 | Menas et al. |
| 2005/0217006 | A1 | 10/2005 | Sutter et al. |
| 2005/0275372 | A1 | 12/2005 | Crowell |
| 2006/0007562 | A1 | 1/2006 | Willey et al. |
| 2006/0101560 | A1 | 5/2006 | Ketterer et al. |
| 2006/0127725 | A9 | 6/2006 | Sarkar et al. |
| 2007/0007823 | A1 | 1/2007 | Huang et al. |
| 2007/0078230 | A1 | 4/2007 | Lai |
| 2007/0141424 | A1 | 6/2007 | Armstrong et al. |
| 2007/0184339 | A1 | 8/2007 | Scheucher |
| 2007/0222301 | A1 | 9/2007 | Fadell et al. |
| 2007/0257654 | A1 | 11/2007 | Krajcovic |
| 2008/0024007 | A1 | 1/2008 | Budampati et al. |
| 2008/0128287 | A1 | 6/2008 | Wu et al. |
| 2008/0130321 | A1 | 6/2008 | Artusi et al. |
| 2008/0215694 | A1 | 9/2008 | Chen et al. |
| 2008/0263752 | A1 | 10/2008 | Solinsky et al. |
| 2008/0269953 | A1 | 10/2008 | Steels et al. |
| 2008/0305839 | A1 | 12/2008 | Karaoguz et al. |
| 2009/0079263 | A1 | 3/2009 | Crumm et al. |
| 2009/0091310 | A1 | 4/2009 | Levenson et al. |
| 2009/0178740 | A1 | 7/2009 | Lenze et al. |
| 2009/0222978 | A1 | 9/2009 | Kenneth |
| 2009/0243390 | A1 | 10/2009 | Oto |
| 2009/0271642 | A1 | 10/2009 | Cheng et al. |
| 2010/0001689 | A1 | 1/2010 | Hultman et al. |
| 2010/0076615 | A1 | 3/2010 | Daniel et al. |
| 2010/0083413 | A1 | 4/2010 | Mcgovern |
| 2010/0130162 | A1 | 5/2010 | Yang |
| 2010/0134077 | A1 | 6/2010 | Krajcovic |
| 2010/0229286 | A1 | 9/2010 | Ahlgren et al. |
| 2010/0280676 | A1 | 11/2010 | Pabon et al. |
| 2010/0295381 | A1 | 11/2010 | Burger et al. |
| 2011/0006603 | A1 | 1/2011 | Robinson et al. |
| 2011/0007491 | A1 | 1/2011 | Robinson et al. |
| 2011/0026282 | A1 | 2/2011 | Chapman et al. |
| 2011/0031911 | A1 | 2/2011 | Marcinkiewicz et al. |
| 2011/0031958 | A1 | 2/2011 | Wang |

(56) References Cited

U.S. PATENT DOCUMENTS

| | | | |
|---|---|---|---|
| 2011/0091029 A1 | 4/2011 | Leblanc | |
| 2011/0094018 A1 | 4/2011 | Rogers et al. | |
| 2011/0154619 A1 | 6/2011 | Ward et al. | |
| 2011/0184585 A1 | 7/2011 | Matsuda et al. | |
| 2011/0193416 A1 | 8/2011 | Campanella et al. | |
| 2011/0198933 A1 | 8/2011 | Ishigaki et al. | |
| 2011/0234000 A1 | 9/2011 | Yan et al. | |
| 2011/0261601 A1 | 10/2011 | Chapman et al. | |
| 2011/0277222 A1 | 11/2011 | Garneau et al. | |
| 2011/0278957 A1 | 11/2011 | Eckhoff et al. | |
| 2012/0002046 A1 | 1/2012 | Rapoport et al. | |
| 2012/0007432 A1 | 1/2012 | Rice et al. | |
| 2012/0011233 A1 | 1/2012 | Dixon et al. | |
| 2012/0092903 A1 | 4/2012 | Nania et al. | |
| 2012/0098334 A1 | 4/2012 | Holmberg et al. | |
| 2012/0144565 A1 | 6/2012 | Huh | |
| 2012/0144567 A1 | 6/2012 | Huh | |
| 2012/0167281 A1 | 7/2012 | Gennrich et al. | |
| 2012/0174294 A1 | 7/2012 | Sackett | |
| 2012/0205976 A1 | 8/2012 | Shih et al. | |
| 2012/0319504 A1 | 12/2012 | Malmberg et al. | |
| 2012/0326516 A1 | 12/2012 | Gurunathan et al. | |
| 2013/0000016 A1 | 1/2013 | Hall et al. | |
| 2013/0038306 A1 | 2/2013 | Kelly et al. | |
| 2013/0141040 A1* | 6/2013 | DeBoer | H02J 3/14 320/109 |
| 2013/0163302 A1 | 6/2013 | Li et al. | |
| 2013/0191967 A1 | 8/2013 | Harris | |
| 2013/0214738 A1* | 8/2013 | Chen | B60L 58/13 320/109 |
| 2013/0239303 A1 | 9/2013 | Cotterman et al. | |
| 2013/0278216 A1 | 10/2013 | Son et al. | |
| 2013/0293013 A1 | 11/2013 | Templeton et al. | |
| 2014/0091623 A1 | 4/2014 | Shippy et al. | |
| 2014/0095915 A1 | 4/2014 | Hitchcock et al. | |
| 2014/0097685 A1 | 4/2014 | Jun et al. | |
| 2014/0103720 A1 | 4/2014 | Robinson et al. | |
| 2014/0130241 A1 | 5/2014 | Abdollahi et al. | |
| 2014/0209377 A1 | 7/2014 | Wang | |
| 2014/0240834 A1 | 8/2014 | Mason | |
| 2014/0292081 A1 | 10/2014 | Long et al. | |
| 2014/0312828 A1 | 10/2014 | Vo et al. | |
| 2015/0137606 A1 | 5/2015 | Adest et al. | |
| 2015/0157079 A1 | 6/2015 | Auranen et al. | |
| 2015/0172827 A1 | 6/2015 | Sharpe et al. | |
| 2015/0237771 A1 | 8/2015 | Natter et al. | |
| 2015/0323945 A1 | 11/2015 | Perier | |
| 2016/0075338 A1 | 3/2016 | Henn | |
| 2016/0094071 A1 | 3/2016 | Nge et al. | |
| 2016/0121735 A1* | 5/2016 | Sugano | B60L 3/00 320/109 |
| 2016/0171864 A1 | 6/2016 | Ciaramelletti et al. | |
| 2016/0286156 A1 | 9/2016 | Kovac | |
| 2016/0295948 A1 | 10/2016 | Dowd et al. | |
| 2016/0329811 A1 | 11/2016 | Du et al. | |
| 2016/0342186 A1 | 11/2016 | Ragupathi et al. | |
| 2017/0027268 A1 | 2/2017 | Folgar | |
| 2017/0077704 A1 | 3/2017 | Faley et al. | |
| 2017/0089172 A1 | 3/2017 | Zhao | |
| 2017/0192474 A1 | 7/2017 | Robinson et al. | |
| 2017/0269460 A1 | 9/2017 | Fagerkvist | |
| 2017/0338665 A1 | 11/2017 | Long et al. | |
| 2018/0003989 A1 | 1/2018 | Terada et al. | |
| 2018/0239144 A1 | 8/2018 | Woods et al. | |
| 2018/0308397 A1 | 10/2018 | Sugimoto et al. | |
| 2018/0353176 A1 | 12/2018 | Shelton, IV et al. | |
| 2019/0101359 A1 | 4/2019 | Zimmer | |
| 2019/0157885 A1 | 5/2019 | Rippel et al. | |
| 2020/0008508 A1 | 1/2020 | Havola | |
| 2020/0019236 A1 | 1/2020 | Parkinson et al. | |
| 2020/0197997 A1 | 6/2020 | Zhou et al. | |
| 2021/0075326 A1 | 3/2021 | Long et al. | |
| 2021/0247059 A1 | 8/2021 | Johnson et al. | |
| 2021/0247618 A1 | 8/2021 | Moore et al. | |
| 2021/0315314 A1 | 10/2021 | Teetzel et al. | |
| 2022/0071336 A1 | 3/2022 | Franzino et al. | |
| 2022/0091634 A1 | 3/2022 | Martin et al. | |
| 2022/0224668 A1 | 7/2022 | Andolina | |

FOREIGN PATENT DOCUMENTS

| | | | |
|---|---|---|---|
| CN | 109923500 | B | 1/2022 |
| DE | 630473 | C | 5/1936 |
| DE | 8138228 | U1 | 6/1983 |
| EP | 0335316 | A2 | 10/1989 |
| EP | 1966850 | A2 | 9/2008 |
| EP | 2230743 | A2 | 11/2013 |
| GB | 1114214 | A | 5/1968 |
| WO | 2006126023 | A1 | 11/2006 |
| WO | 2007012785 | A1 | 2/2007 |
| WO | 2007048837 | A1 | 5/2007 |
| WO | 2007076440 | A2 | 7/2007 |
| WO | 2008072014 | A1 | 6/2008 |
| WO | 2008072015 | A1 | 6/2008 |
| WO | 2008090378 | A1 | 7/2008 |
| WO | 2011023678 | A2 | 3/2011 |
| WO | 2011046645 | A1 | 4/2011 |
| WO | 2011113280 | A1 | 9/2011 |
| WO | 2012122315 | A1 | 9/2012 |
| WO | 2013083296 | A2 | 6/2013 |
| WO | 2014165469 | A1 | 10/2014 |
| WO | 2016016445 | A2 | 4/2016 |
| WO | 2016105273 | A1 | 6/2016 |
| WO | 2017087130 | A1 | 5/2017 |
| WO | 2018017908 | A1 | 1/2018 |
| WO | 2018173313 | A1 | 9/2018 |
| WO | 2020109887 | A1 | 6/2020 |
| WO | 2020217089 | A1 | 10/2020 |
| WO | 2020237189 | A1 | 11/2020 |
| WO | 2022115531 | A1 | 6/2022 |

OTHER PUBLICATIONS

Alibaba.com, 5KW charger controller for wind power supply and solar cell, 2009, 3 pages.

Amazon.com: Morningstar TriStar-45 Solar Charge Controller for solar/wind generator/Wind Turbine-45 amps, 2009, 6 pages.

AU Examination Report corresponding to Application No. 2010307261, dated Jul. 23, 2013.

AU Examination Report corresponding to Application No. 2014248342, dated Sep. 7, 2017, 3 pages.

BA 5590 Lithium Battery, http://defense-update.com/products/b/ba5590.htm, Jul. 26, 2006, 1 page.

Battery Management Systems (BMS), 2009, www.mpoweruk.com/bms.htm., 12 pages.

Becherif, M., et al., "Advantages of variable DC bus voltage for Hybrid Electrical Vehicle", Vehicle Power and Propulsion Conference (VPPC), 2010, pp. 1-6.

Bruce et al., "Military takes aim at high battery costs", Defense Electronics, Apr. 2005, pp. 20-25.

Button, Robert M., "Intelligent Systems for Power Management and Distribution", NasaiTM-2002-211370, Feb. 2002, 12 pages.

CA Office Action corresponding to Application No. 2020033207, dated Jan. 23, 2023, 5 pages.

CA Office Action corresponding to Application No. 3,138,704, dated Jan. 10, 2022, 5 pages.

CA Office Action corresponding to Application No. 3,138,704, dated Jan. 22, 2022, 5 pages.

Chen, Bo et al., "Lightweight Service Mashup Middleware With REST Style Architecture for IoT Applications", IEEE Transactions on Network and Service Management, IEEE, USA, vol. 15, No. 3, Sep. 1, 2018, pp. 1063-1075.

Cipriano, Greg et al., Protonex, Joint Service Power Expo, 2009, 38 pages.

Conti, M., et al., SystemC modeling of a dynamic power management architecture, 6 pages.

Dangora, Lisa M., et al., "Deep-Drawing Forming Trials on a Cross-Ply Thermoplastic Lamina for Helmet Preform Manufacture", Journal of Manufacturing Science and Engineering, vol. 139, No. 3, Mar. 2017, 8 pages.

(56) References Cited

OTHER PUBLICATIONS

Dirish, Mat, "Engineer Seeks Cure For Common Wall Warts", https://www.electronicdesign.com/markets/energy/article/21761343/engineer-seeks-cure-for-common-wall-warts, Aug. 2008, 3 pages.
Duarte, Jorge L., et al., "Three-Port Bidirectional Converter for Hybrid Fuel Cell Systems", IEEE Transactions on Power Electronics, vol. 22, No. 2, 2007, 8 pages.
Energy Harvesting Journal: Soldier-worn portable power management system, Apr. 2009, http://www.energyharvestingjournal.com/articles/soldier-worn-portable-power-management-system-00001375.asp?sessionid=1, 2 pages.
EP Extended Search Report corresponding to Application No. 22189026, dated Jan. 23, 2023, 7 pages.
EP Extended Search Report corresponding to Application No. 22209825.3, dated Apr. 13, 2023, 4 pages.
EP Extended Search Report corresponding to Application No. 23173563.0, dated Oct. 11, 2023, 9 pages.
EP Extended Search Report corresponding to Application No. 23173566.3, dated Oct. 12, 2023, 11 pages.
EP Search Report corresponding to Application No. 14780196.3, dated Dec. 9, 2016, 11 pages.
EP Search Report corresponding to Application No. 16866830.9, dated Mar. 1, 2019, 9 pages.
EP Search Report corresponding to Application No. 20808866.6, dated May 3, 2022, 25 pages.
Evans, Ian C. et al., "High power clean DC bus generation using AC-link AC to DC power voltage conversion, DC regulation, and galvanic isolation", IEEE Electric Ship Technologies Symposium, 2009, 12 pages.
Fursin, Leonid et al., "Development of Compact Variable-Voltage, Bi-Directional 100KW DC-DC Converter", 2007, 9 pages.
Garcia, Julio, "Efficiency Improvement in Autonomous Electric Vehicles using Dynamic Commutation of Energy Resources", 2009 Barcelona Forum on Ph.D. Research in Electronic Engineering, 2 pages.
Green Plug, www.greenplug.us, One plug one planet, 2009, 7 pages.
Hoffart, Fran, "New Charger Topology Maximizes Battery Charging Speed", Design Note 194, 1998, 2 pages.
Hong, Inki et al., "Power Optimization of Variable-Voltage Core-Based Systems", IEEE Transactions on Computer-Aided Design of Integrated Circuits and Systems, vol. 18, No. 12, Dec. 1999, pp. 1702-1714.
International Preliminary Report on Patentability corresponding to Application No. PCT/US2021/016807, dated Jul. 28, 2022, 8 pages.
International Preliminary Report on Patentability corresponding to Application No. PCT/US2020/033207, dated Jul. 30, 2020, 17 pages.
International Search Report and Written Opinion corresponding to Application No. PCT/IB2013/003041, dated Feb. 9, 2015, 12 pages.
International Search Report and Written Opinion corresponding to Application No. PCT/JP2008/066605, dated Dec. 16, 2008, 11 pages.
International Search Report and Written Opinion corresponding to Application No. PCT/US2010/41335, dated Mar. 24, 2011,11 pages.
International Search Report and Written Opinion corresponding to Application No. PCT/US2016/058922, dated Feb. 9, 2017, 6 pages.
International Search Report and Written Opinion corresponding to Application No. PCT/US2016/062863, dated Mar. 30, 2017, 6 pages.
International Search Report and Written Opinion corresponding to Application No. PCT/US2020/033207, dated Jul. 30, 2020.
International Search Report and Written Opinion corresponding to Application No. PCT/US2021/016807, dated Dec. 28, 2021, 11 pages.
International Search Report and Written Opinion corresponding to Application No. PCT/US2022/28754, dated Aug. 29, 2022, 12 pages.
International Search Report and Written Opinion corresponding to Application No. PCTUS2014/032455, dated Sep. 8, 2014, 12 pages.
Jai, C.S., Green Technology, "Green Plug Partners with Wipower for Advanced Wireless Power Systems", http://green.tmcnet.com/topics/green/articles/57729-green-plug-partners-with-wipower-advanced-wireless-power.htm, Jun. 10, 2009, 3 pages.
Karlsson, et al., "DC Bus Voltage Control for a Distributed Power System", IEEE Transactions on Power Electronics, Nov. 2003, vol. 18, No. 6, pp. 1405-1412.
Khan, F.H. et al., "Bi-directional power management and fault tolerant feature in a 5-kW multilevel dc-dc converter with modular architecture", IET Power Electron, vol. 2, Issue 5, 2009, pp. 595-604.
Kriechenbauer et al., "Deep Drawing with Superimposed Low-Frequency Vibrations on Servo-Screw Presses", Procedia Engineering, vol. 81, 2014, pp. 905-913.
Lu et al., A Novel Surface Texture Shape for Directional Friction Control, Tribology Letters, 2018, vol. 66, No. 51, 13 pages.
Merkle, Matthew Alan, "Variable Bus Voltage Modeling for Series Hybrid Electric Vehicle Simulation", Thesis submitted to the faculty of Virginia Polytechnic Institute and State University, Dec. 1997, 33 pages.
Nihon Kohden: Products-Monitoring, Smart Cable Technology, 2004, www.nkusa.com/prod-monitor-smart-cable.htm, 1 page.
Ocean Server Technology, Inc., Intelligent Battery and Power System, May 2008, 4 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Paneltronics, "What is Power Sign?", Multiplex Distribution Systems, 2006, www.paneltronics.comlip.asp?op=Multiplex%20Distributions%20Systems, 2 pages.
Patel et al., "Parametric Analysis of Deep Drawing Process for Hemisphere Dome Shape of Steel AISI 1023", Journal of Basic and Applied Engineering Research, vol. 1, No. 2, Oct. 2014, pp. 9-16.
Podesser, Peter, "Portable power management for soldiers: Fuel cell hybrid system is lighter, safer", Military Embedded Systems, May 2009, 7 pages.
Reuters, "Protonex to Launch Soldier-Worn Portable Power Management Systems", Feb. 2009, http://www.reuters.com/article/pressRelease/idUS159777+17-Feb-2009+BW20090217, 3 pages.
Reyneri, et al., "A redundant power bus for distributed power management for a modular satellite", IAC-09.C3.2.8, 2009, 8 pages.
Richter, Wolfgang, Chip for saving power, Aug. 2007, 2 pages.
Rothman, Wilson, "New Honeywell HDMI Cable Heals Self, But At What Cost?", gizmodo.com/295076/new-honeywell-hdmi-cable-heals-self-but-at-what-cost-0295076, Aug. 2007, 3 pages.
SFC Energy Press Release, "SFC receives commercial order for portable fuel cells", Feb. 11, 2008, Retrieved from Internet: www.sfc.com/index2.php option=com_pressreleasees&Itemid=467&id=1050&lang=en&pop-1&page=0, 1 page.
SFC Power Manager—The Technology, 2009, replay.waybackmachine.org/20090312005238/http://ww.sfc.com/en/man-portable-technology-power-manager.html, 2 pages.
SFC smart fuel cell launches joint power manager, Jun. 2009, http://fuelcellsworks.com/news/2009/06/04/sfc-smart-fuel-cell-launches-joint-power-manager, 4 pages.
SFC Smart Fuel Cell, replay.waybackmachine.org/20090122152343/http://www.sfc.com/en/about-sfc.html, 2009, 1 page.
Singh, et al., "Fuzzy Logic-Based Solar Charge Controller For Microbatteries", Conference Record of the Twenty-Eighth IEEE Photovoltaic Specialists Conference, 2000, pp. 1726-1729.
International Preliminary Report on Patentability and Written Opinion corresponding to Application No. PCT/US2016/062863, dated May 22, 2018, 5 pages.

* cited by examiner

POWER MANAGER WITH RECONFIGURABLE POWER CONVERTING CIRCUITS

CROSS REFERENCE TO RELATED U.S. PATENT APPLICATIONS

The present application is a continuation of and claims benefit of non-provisional U.S. application Ser. No. 17/559,771 filed on Dec. 22, 2021, which is a continuation of and claims the benefit of non-provisional U.S. application Ser. No. 17/081,716 filed on Oct. 27, 2020 (now issued U.S. Pat. No. 11,258,366), which is a continuation of and claims the benefit of non-provisional U.S. application Ser. No. 16/415,336 filed May 17, 2019 (now issued U.S. Pat. No. 10,848,067), which is a continuation-in-part of non-provisional U.S. patent application Ser. No. 15/774,380 filed May 8, 2018 (now issued U.S. Pat. No. 11,108,230), which is a U.S. National Phase application of Patent Cooperation Treaty International Application No. PCT/US2016/058922, filed on Oct. 26, 2016, which claimed the benefit of U.S. Provisional Patent Application Ser. No. 62/257,995 filed Nov. 20, 2015, each of which is incorporated herein by reference in their entirety and for all purposes.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright @ Revision Military Ltd.

BACKGROUND OF THE INVENTION

Field of the Invention

The exemplary, illustrative, technology herein relates to a reconfigurable converter power circuit. The reconfigurable converter power circuit includes a single one-way DC to DC power converter, multiple converter channel legs, and multiple switches. The reconfigurable converter power circuit can be configured as one of an input power converting channel, and output power converting channel, or a bi-directional bus-compatible power channel by configuring sets of the multiple switches as either open or closed. A power manager includes at least one reconfigurable power circuit connected to a device port and connected to a power bus. The reconfigurable converter power circuit can be configured to connect the device port to the power bus. The reconfigurable converter power circuit can be reconfigured for three different functions: input power signal voltage conversion, output power signal voltage conversion, and input or output power signal with no voltage conversion. A power node includes a first power device port and second power device port and a reconfigurable converter power circuit connected to the first power device port and to the second power device port. The reconfigurable converter power circuit can be configured to connect the first and second power device ports. The reconfigurable converter power circuit can be reconfigured for three different functions: first power device port to second power device port signal voltage conversion, second power device port to first power device port signal voltage conversion, and no voltage conversion between first power device port and second power device port.

The Related Art

Portable power manager devices are used to scavenge DC power from external power devices, i.e. DC power sources and energy storage devices such as rechargeable DC batteries. The scavenged power received from external DC power and energy sources is used to power a power bus operating on the portable power manager. External power devices that need power, i.e. DC power loads and or energy storage devices such as rechargeable DC batteries are interfaced to the power bus to draw power from the power bus.

Conventional power managers include a plurality of device ports connected to an internal DC power bus. An external DC power device is connected to a device port. Typically each device port includes a direct connect power channel usable to directly connect an external power device connected to a device port to the power bus without voltage conversion. In conventional power managers direct connect power channels include a switch, operable by a digital processor operating on the power manager, to directly connect an external DC power device to the power bus or to disconnect the external power device from the power bus.

Conventional portable power manager devices use a fixed bus voltage selected to match the operating voltage of most of the external DC power devices that will be powered by or recharged by the power manger. Thus when the power manager is expected to be used to power 12 VDC devices its bus voltage operating range might be set at 12 to 15 VDC. Thus whenever an external DC power device has an operating voltage that is matched to the bus voltage, that external power device can be connected to the DC power bus over the direct connect power channel as long as other criteria favor the connection. Thus each device port includes a direct connect power channel which is bidirectional and can be used to receive input power from an external power device or to deliver output power to an external power device as long as the external power device is compatible with the bus voltage In conventional portable power managers each device port also may be associated with a power converting power channel that includes either an input DC to DC power converter or an output DC to DC power converter and at least one switch operable by the digital processor operating on the power manager to connect an external DC power device to the power bus over the power converter channel or to disconnect the external DC power device from the power bus or to prevent the connection as needed. In cases where an external DC power device is a non-bus compatible DC power or energy source usable to scavenge input power; the external device is connected to the power bus over a power converting channel that includes an input power converter. In cases where an external DC power device is a non-bus compatible DC power load or rechargeable energy storage device that needs to be powered, the external device is connected to the power bus over an output power DC to DC converter.

Examples of conventional portable power managers are disclosed in U.S. Pat. No. 8,775,846, entitled Portable Power Manager; U.S. Pat. No. 8,638,011, entitled Portable Power Manager Operating Methods; and U.S. Pat. No. 8,633,619, entitled Power Managers and Methods for Operating Power Managers all to Robinson et al. describing portable power manager devices and operating methods. In these examples the power manager devices include six device ports that can each be connected to a power bus or disconnected from the power bus by operating switches under the control or a digital process or CPU. The power bus operates at a fixed bus voltage which can vary slightly over a range. All six device ports include a direct connect bidirectional power channel that extends from the power bus to the device port. Each direct connect power channel includes a switch operable by the digital processor. Thus any one of the six device ports can be connected to the power bus over a direct connect power channel when an external power device connected to the device port is a bus voltage compatible device and this includes any DC power source, DC power load, or rechargeable battery that can be operated at the bus compatible voltage.

The device disclosed by Robinson et al. includes a total of three DC to DC power converters with one power converter arranged as an input power converter and two power converters arranged as output power converters. More specifically the input power converter is shared by two input ports and each of the two output power converters is shared by two output ports. One problem with this configuration is that while there are six device ports only three of the six device ports can use one of the three DC to DC power converters at the same time. More specifically only one input device port can be connected to the power bus over an input power converting channel and only two output device ports can be connected to the power bus over an output power converting channel at the same time. In practice this can result in situations where only three device ports or at least less than all six device ports can be utilized.

This problem can be solved by providing an input power converting channel and an output power converting channel between each device port and the power bus; however, such a device is more costly and increases the weight and device package size. Meanwhile there is a need in the art to decrease the cost weight and package size of conventional portable power managers.

Another problem with conventional portable power managers that use a fixed bus voltage is that the fixed power manager bus voltage tends to limit the type of external DC power devices that it can be used with. Specifically a portable power manager having a fixed 12 VDC bus voltage is best suited to scavenge power for external power devices that operate at 12 VDC. However, for the reasons stated above, the same conventional portable power manager is not as effective in an environment where most external power devices that need to be powered by the power bus operate at 48 VDC. Thus there is a need in the art to provide a power manager that can operate at different bus voltages depending in part on the operating voltage of external DC power devices that need to be connected to the power bus.

SUMMARY OF THE INVENTION

The problems with conventional power managers described above are overcome by the present invention which includes a novel power manger configuration and operating methods.

A reconfigurable power circuit (400) includes a first electrical connection interface (271) and a second electrical connection interface (272). A one-way DC to DC power converter (220) includes an input terminal (222) for receiving input power at a first power amplitude and an output terminal (224) for delivering output power at a second power amplitude. A plurality of converter channel legs (243, 245, 247, and 249) is arranged as three different conductive pathways including a first bidirectional current flow path (234, 400*a*) that extends from the first electrical connection interface to the second electrical connection interface. In one embodiment the first bidirectional current flow path (234) does not pass through the DC to DC power converter and does not charge input and output bulk capacitors (225, 226). In another embodiment, the first bidirectional current flow path (400*a*) passes through the one-way DC to DC power converter from the input terminal thereof to the output terminal thereof while the DC to DC power converter is configured with a zero-voltage conversion set point. The first bidirectional current flow path (400*a*) also charges input and output bilk capacitors.

A second, one-way current flow path (232) extends from the first electrical connection interface to the input terminal (222) through the one-way DC to DC power converter (220) to the output terminal (224) and from the output terminal to the second electrical connection interface. A third one-way current flow path (230) extending from the second electrical connection interface to the input terminal (222) through the one-way DC to DC power converter (220) to the output terminal (224) and from the output terminal to the first electrical connection interface.

At least one configurable switch disposed along each one of the plurality of converter channel legs. Closing one or more of the configurable switches and opening one or more others of the configurable switches enables exclusive current flow along one of the first bidirectional current flow path (234, 400*a*), the second, one-way current flow path (232), and the third one-way current flow path (230) The reconfigurable power circuit includes four channel legs (243, 245, 247, and 249) with one configurable switch (253, 255, 257, and 259) disposed along each channel leg. Exclusive current flow any one of the first bidirectional current flow path (234), the second, one-way current flow path (232) or the third one-way current flow path (230) can be established by closing at two or three of the four configurable switches and by opening two or one other of the four configurable switches.

The reconfigurable power circuit includes one or more input current sensors (262) and or one or more input voltage sensors (264) for measuring input current or voltage amplitude at either side or the input interface (222) or the output interface (224) or at either one of the first electrical and second electrical connection interface points. The reconfigurable power circuit includes one or more output current sensors (265) and or one or more output voltage sensors (267) for measuring input voltage amplitude or output voltage amplitude at either side or the input interface (222) or the output interface (224) or at either one of the first electrical and second electrical connection interface points.

The reconfigurable power circuit can be included in a power manager device (500, 1000) configured with one or both of first electrical connection interface (271) and the second electrical connection interface (272) as a device port and operated to exchange power between two external DC power devices each connected to a different one of the device ports. Alternately, the first electrical connection interface (271) is configured as a device port and the second electrical connection interface (272) electrically interfaced with a DC power bus (110). In an embodiment a plurality of reconfigurable power circuits is interfaced with a DC power bus at second electrical interface and the first electrical interface of each of the plurality of reconfigurable power circuits is configured as a device port. In operation, DC power is exchanged between external DC power device interfaced with the device ports and the DC power bus. A primary device channel (153) is electrically interfaced with the DC power bus. The primary device channel is a bidirectional non power converting channel. A primary device port (143) electrically interfaced with the primary device channel.

The one-way DC to DC power converter (220) is operable by an electronic controller to receive input power at a first input power voltage amplitude at the input terminal (222) and deliver output power from the output terminal (224) at second output voltage amplitude, different from the first input voltage amplitude. Alterably the one-way DC to DC power converter is operable by the electronic controller to receive input power at a first input current amplitude at the input terminal (222) and deliver output power from the output terminal (224) at second output current amplitude, wherein the second output current amplitude is less than the first input current amplitude.

A power distribution system (1000) includes a DC power bus (110) and a plurality of the reconfigurable power circuits (400*a*, 400*b*). The first electrical connection interface (271) of each of the plurality of reconfigurable power circuits is configured as a first device port (141, 142) and the second electrical connection interface (272) of each of the plurality of the reconfigurable power circuits is interfaced with a DC power bus (110). A primary device channel (153) has a first end thereof terminated by a primary device port (143) and a second end thereof electrically interfaced with the DC power bus with a configurable switch (261) disposed along the primary device channel. A digital data processor (120) is electrically interfaced with a memory module, with each of the device ports (141, 142, 143) and with all of the controllable switches corresponding with all of the reconfigurable power circuits. The digital data processor is also electrically interfaced with the one-way DC to DC power converter of each of the plurality of reconfigurable power circuits. At least one sensor is electrically interfaced with the digital data processor and is positioned to measure one of an instantaneous input power amplitude and an instantaneous output power amplitude either at the DC power bus or corresponding with measurement points corresponding with any of the plurality of reconfigurable circuits. An energy management schema program is operated on the digital data processor. The system operates to autonomously exchange power between at least two external DC power devices electrically interfaced with any one of the first device port (141, 142) and the primary device port (143).

A Maximum Power Point Tracking (MPPT) module (512) can be operated by the digital data processor to manage input power from a time variable voltage source such as a solar or wind power generation device. The MPPT module operates to provide current attenuation and voltage conversion set points to the one what DC to DC power converter to converts variable voltage input power to substantially non-variable voltage output power.

An operating method for the reconfigurable circuit for a single reconfigurable circuit that include a device port at each electrical interface point includes evaluating, by the energy management schema, DC power characteristics at each of the electrical interface points. The method may use measuring a power condition by one or more sensors or receiving power characteristics data from one or more of the two external DC power devices. The method includes selecting, by the energy management schema, based on the DC power characteristic evaluation, one external DC power device as a power source and another external DC power device as a power load. The energy management schema then determines, based on the DC power characteristic evaluation, a DC to DC voltage conversion setting for operating the one-way DC to DC power converter and selects a configuration of the reconfigurable power circuit that corresponds with the DC to DC voltage conversion setting. The configuration of the reconfigurable power circuit includes any one of the first bidirectional current flow path between the device ports, the second, one-way current flow path extending from the first device port to an input terminal of the one-way DC to DC power converter through the one-way DC to DC power converter to an output terminal of the one-way DC to DC power converter to the second device port or the third one-way current flow path extending from the second device port to the input terminal through the one-way DC to DC power converter to the output terminal and from the output terminal to the first device port.

These and other aspects and advantages will become apparent when the Description below is read in conjunction with the accompanying Drawings.

BRIEF DESCRIPTION OF THE DRAWINGS

The features of the present invention will best be understood from a detailed description of the invention and example embodiments thereof selected for the purposes of illustration and shown in the accompanying drawings in which.

DESCRIPTION OF SOME EMBODIMENTS OF THE INVENTION

Definitions

Figure 1:
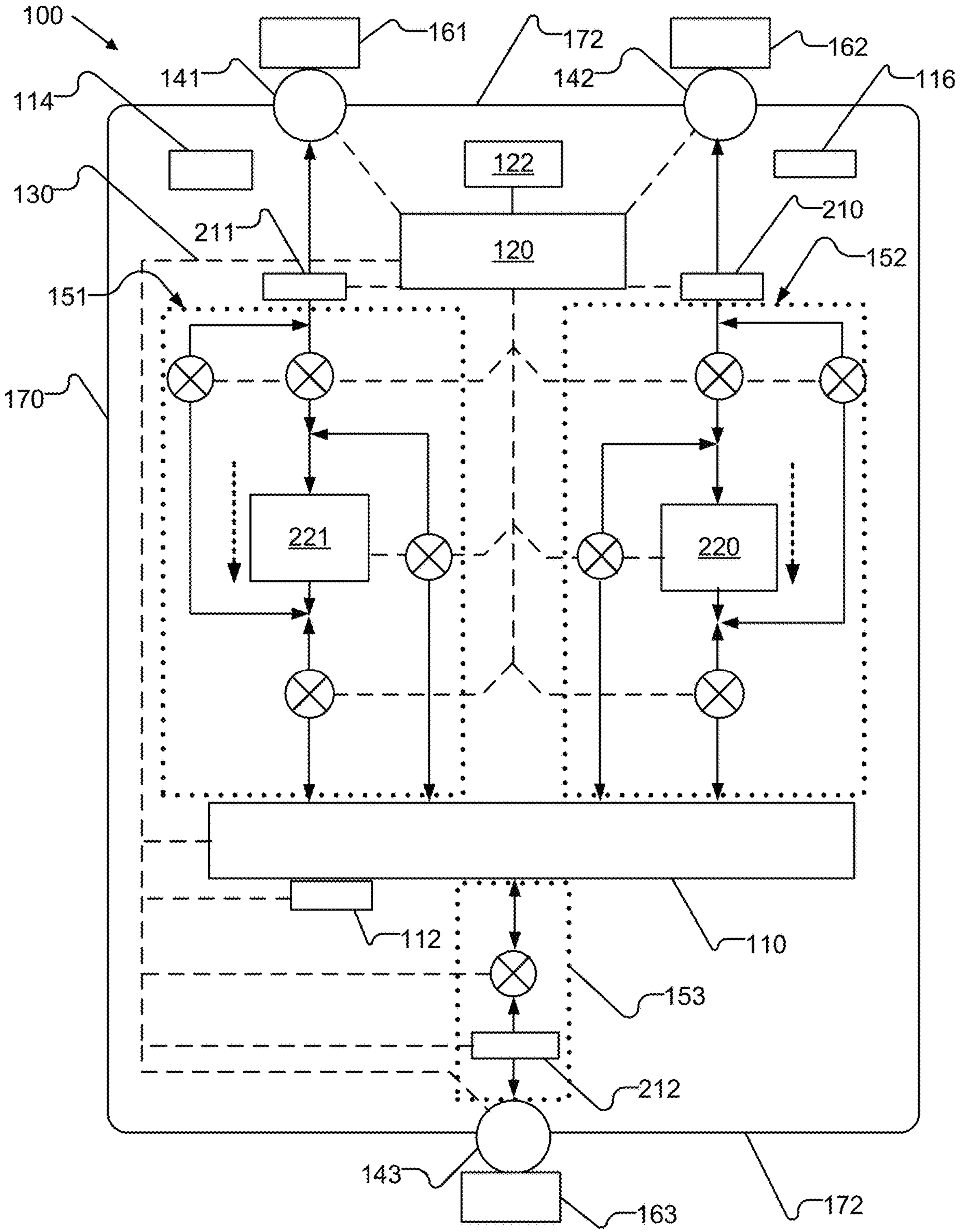
FIG. 1 depicts an exemplary schematic diagram of a non-limiting exemplary power manager according to one aspect of the present invention.

The following definitions are used throughout, unless specifically indicated otherwise:

| TERM | DEFINITION |
|---|---|
| External Power Device | A DC power load, a DC power source, or a re-chargeable DC battery. |
| Energy Management Schema | An energy management schema includes various programs, firmware algorithms, and policy elements operating on a digital data processor to receive input power into a power manager from one or more device ports and to distribute output to external power devices connected to one or more device ports. |

ITEM NUMBER LIST

The following item numbers are used throughout, unless specifically indicated otherwise.

| # | DESCRIPTION |
|---|---|
| 100 | Power manager |
| 110 | DC power bus |
| 112 | Power bus power sensor module |
| 114 | Network communication |
| 116 | Internal battery |
| 120 | Digital data processor |
| 122 | Memory module |
| 130 | Communication channel |
| 141 | First converter device port |
| 142 | Second converter device port |
| 143 | Primary device port |
| 151 | First reconfigurable converter power circuit |
| 152 | Second reconfigurable converter power circuit |
| 153 | Primary power channel |
| 161 | Secondary external DC power device |
| 162 | Secondary external DC power device |
| 163 | Primary external DC power device |
| 170 | Power manger enclosure |
| 172 | Enclosure side wall |
| 174 | Enclosure top wall |
| 176 | Physical connector |
| 177 | Physical connector |
| 178 | Physical connector |
| 180 | Shielded cable |
| 181 | Distal end of cable |
| 183 | Proximal end of cable |
| 184 | Cable gland |
| 186 | Cable conductive elements |
| 200 | Power manager enclosure |
| 210 | Converter circuit power sensor module |
| 211 | Converter circuit power sensor module |
| 212 | Primary channel power sensing module |
| 220, 221 | One-way DC to DC power converter |
| 222 | Power converter input terminal interface |
| 222a | Power converter input terminal interface |
| 222b | Power converter input terminal interface |
| 224 | Power converter output terminal |
| 224a | Power converter output terminal |
| 224b | Power converter output terminal |
| 225 | Input bulk capacitor |
| 225a | Input bulk capacitor |
| 225b | Input bulk capacitor |
| 227 | Output bulk capacitor |
| 227a | Output bulk capacitor |
| 227b | Output bulk capacitor |
| 230 | Power converting output power |
| 231 | Power converting output |
| 232 | Power converting input power |
| 233 | Power converting input |
| 234 | Bus compatible power channel |
| 235 | Bus compatible conductive |
| 243 | Converter channel leg |
| 243a | Converter channel leg |
| 243b | Converter channel leg |
| 245 | Converter channel leg |
| 245a | Converter channel leg |
| 245b | Converter channel leg |
| 247 | Converter channel leg |
| 247a | Converter channel leg |
| 247b | Converter channel leg |
| 249 | Converter channel leg |
| 249a | Converter channel leg |
| 249b | Converter channel leg |
| 251 | Primary leg |
| 253 | First configurable switch |
| 253a | First configurable switch |
| 253b | First configurable switch |
| 255 | Second configurable switch |
| 255a | Second configurable switch |
| 255b | Second configurable switch |
| 257 | Third configurable switch |
| 257a | Third configurable switch |
| 257b | Third configurable switch |
| 259 | Fourth configurable switch |
| 259a | Fourth configurable switch |
| 259b | Fourth configurable switch |
| 261 | Primary configurable switch |
| 262 | Input current sensor module |
| 262a | Input current sensor module |
| 262b | Input current sensor module |
| 264 | Input voltage sensor module |
| 264a | Input voltage sensor module |
| 264b | Input voltage sensor module |
| 265 | Output current sensor module |
| 265a | Output current sensor module |
| 265b | Output current sensor module |
| 267 | Output voltage sensor module |
| 267a | Output voltage sensor module |
| 267b | Output voltage sensor module |
| 271 | First electrical connection interface |
| 271a | First electrical connection interface |
| 271b | First electrical connection |
| 272 | Second electrical connection |
| 272a | Second electrical connection |
| 272b | Second electrical connection interface |
| 300 | Wire assembly |
| 400 | Reconfigurable power circuit |
| 400a | Reconfigurable power circuit |
| 400b | Reconfigurable power circuit |
| 401 | Reconfigurable power circuit |
| 500 | Power node |
| 510 | Electronic controller |
| 512 | (MPPT) module |
| 514 | Communication interface device |
| 520 | Battery |
| 530 | First power device port |
| 532 | Second power device port |
| 540 | First power device |
| 542 | Second power device |
| 550 | First device port power sensor |
| 552 | Second device port power sensor |
| 560 | Power node communication channel |
| 570 | Power node enclosure |

Exemplary System Architecture

Referring to FIG. 1, an exemplary, non-limiting power manager (100) according to the present invention is shown in schematic view. The power manager (100) includes a digital data processor (120) and an associated memory module (122). The digital data processor (120) includes a programmable logic device operating an energy management schema program and carrying out logical operations such as communicating with external DC power devices (161, 162, 163), connected to device ports (141, 142, 143), managing the memory module (122) to store and recall data, reading sensor signals from power sensors, altering an operating voltage of a DC power bus (110), and operating one or more reconfigurable power circuits and related power channel control devices to establish a power network operable to exchange power from one external DC power device to another.

Variable Voltage DC Power Bus

Power manager (100) includes a variable voltage DC power bus (110). An operating voltage of the DC power bus (110) can be set by the digital data processor (120). In an example operating mode, the operating voltage of the DC power bus (110) is matched to an operating voltage of an external DC power device (163) interfaced with a primary device port (143). The primary device port (143) is connected to the power bus (110) over a primary power channel that does not include a power converter. Accordingly the operating voltage of the primary external DC power device (163) is always used to establish the operating voltage of the DC power bus (110).

Power manager (100) includes a bus power sensor module (112) in electrical communication with DC power bus (110) and in communication digital data processor (120) and operable to measure and report instantaneous DC voltage at the DC power bus (110) to the digital data processor (120). Bus power sensor module (112) may determine one or more of instantaneous power, instantaneous voltage, and/or instantaneous current amplitude at the DC power bus (110).

Device Ports

The power manager (100) described below includes three device ports; however, any practical implementation that includes two or more device ports is within the scope of the present invention. In each embodiment, the power manager includes a single primary device port (143) and one or more secondary device ports (141, 142). Each device port provides a wired electrical connection interface over which an external DC power device (161, 162, and 163) can be electrically interfaced to the power manager by a wire connection that at least includes a power channel. Each device port (141, 142, 143) also includes a communication channel or interface such as SMBus or the like operable to provide a digital communication link between the digital data processor (120), and an external DC power device electrically interfaced with each device port. Each device port (141, 142, and 143) includes a power channel operable to exchange a power signal between the DC power bus (110) and an external DC power device electrically interfaced to the device port. The communication channel can be a wired communication channel or a wireless communication channel. Also the power channel may include an inductive portion for power exchange from the device port to an external DC power device across a non-wire medium.

Cable Gland

Figure 2:
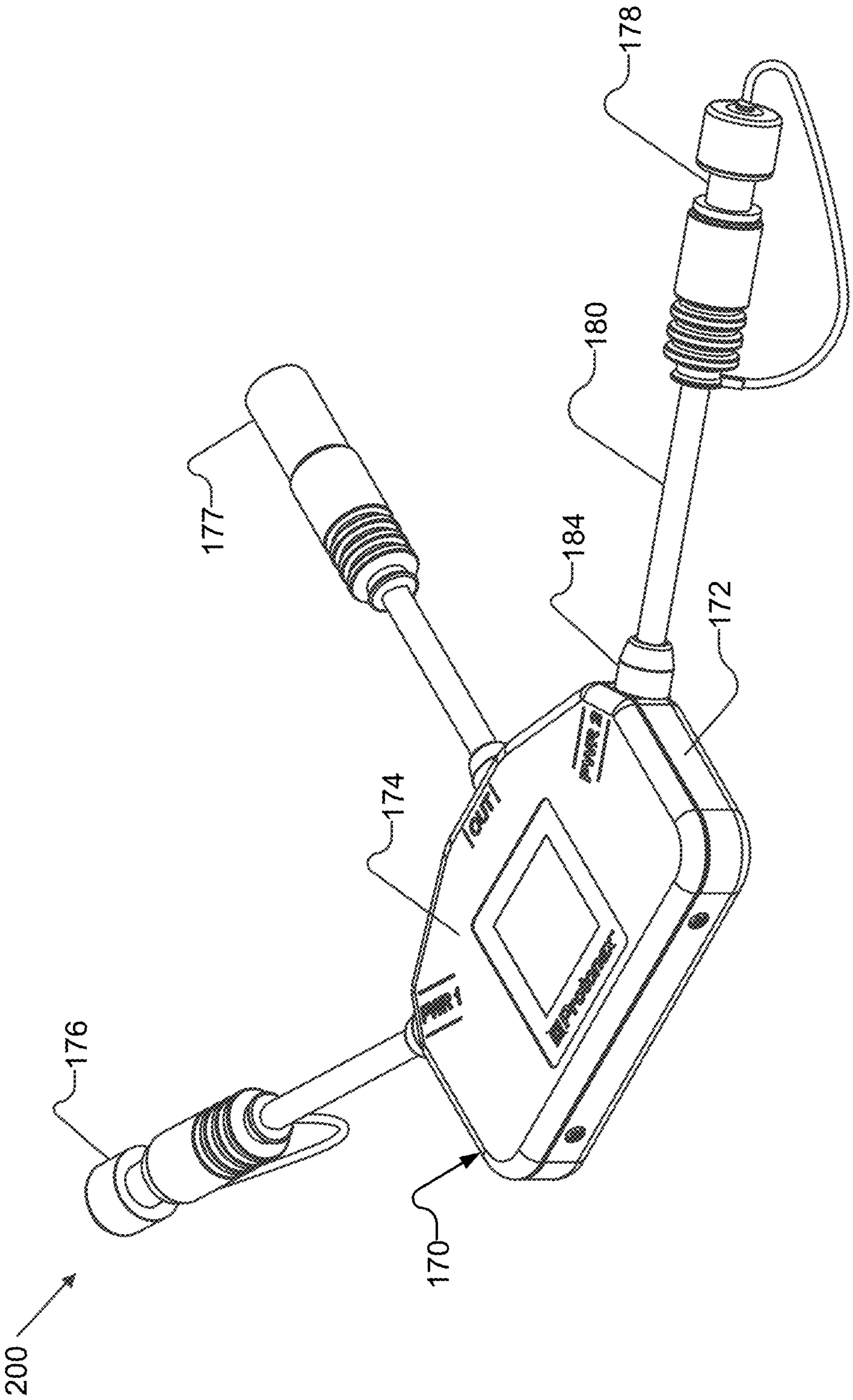
FIG. 2 depicts a perspective view of a non-limiting exemplary power manager according to one aspect of the present invention.
Figure 3:
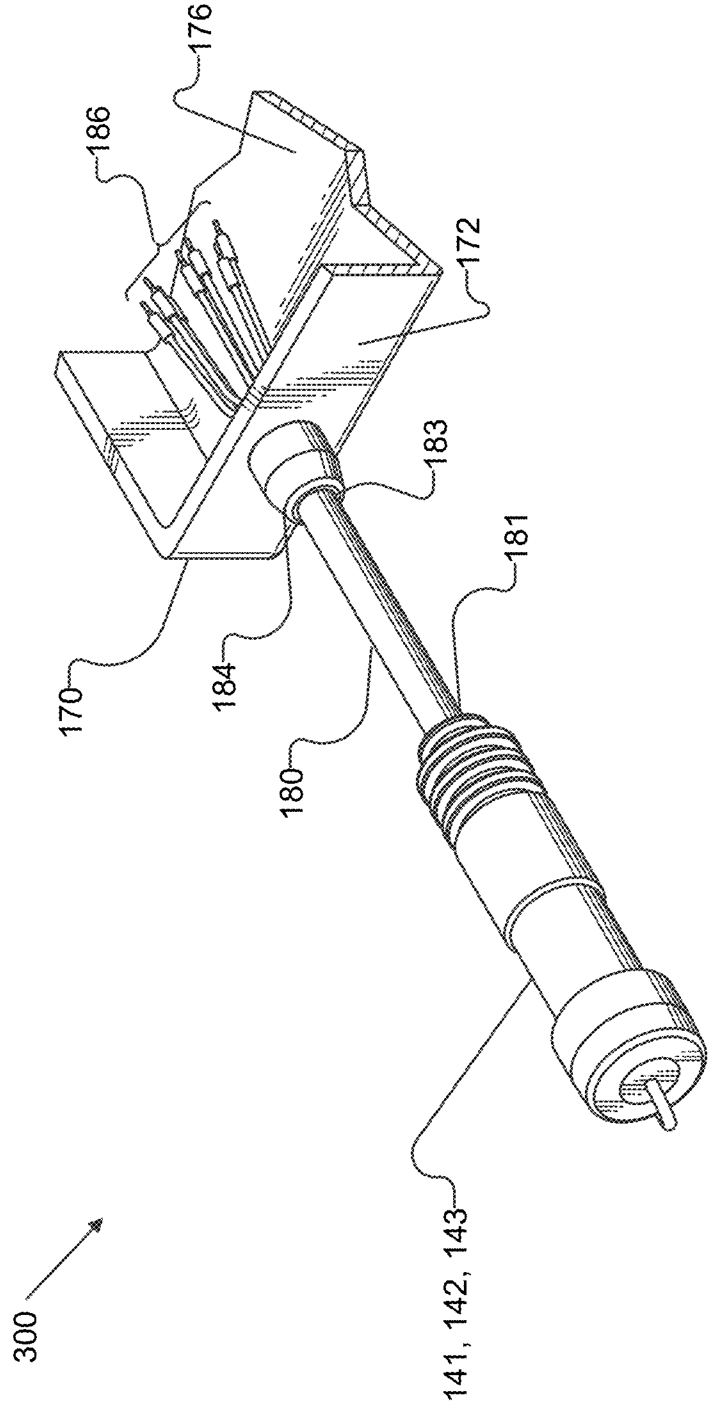
FIG. 3 depicts a perspective view of a non-limiting exemplary cable assembly according to one aspect of the present invention.

Referring to FIGS. 1-3 in an exemplary, non-limiting, embodiment power manager (200) includes a sealed and substantially weather and dust tight power manager device enclosure (170) including a plurality of enclosure side walls (172) an enclosure top wall (174) and an opposing enclosure bottom wall opposed to the top wall (174). The enclosure (170) encloses components of the power manager (100) including the digital data processor (120), the DC power bus (110), and the power circuits and channels (151, 152, and 153). In a non-limiting embodiment, the device ports (141, 142, and 143) are connected to distal ends (181) of wire cables (180) that pass through the enclosure side walls (172) at a proximal end.

In a preferred embodiment each device port comprises a first physical connector or plug (176, 177, and 178) suitable for connecting to an external power device connected to the distal end (181) of wire or cable (180). Each first physical connector or plug is suitable for mating with any external DC power device having a comparable second physical connector or plug. In a preferred embodiment external DC power devices are easily connected to or disconnected from any one of the first physical connectors to electrically interface with the power manager.

Referring to FIG. 3 which depicts a wire assembly (300), each device port includes a cable gland (184) passing through one of the enclosure side walls (172). The wire cables (180) each preferably comprise a shielded cable wherein a proximal end (183) of each wire cable passes through a different cable gland (184) and a distal end (181) of each the wire cables is terminated by a first physical connector (176, 177, and 178). Each cable gland (184) passes through an aperture passing through an enclosure side wall (172) and is attached to and mechanically supported by the enclosure side wall (172). Each wire cable (180) includes conductive elements (186) enclosed by a cable shielding layer which is further enclosed by an electrically insulating cable outer covering. Some of the conductive elements (186) at the proximate end of each wire cable are electrically interfaced with one of the power channels (151, 152, and 153) which provide a conductive path to the DC power bus (110). Some of the conductive elements (186) at the proximal end of each wire cable may be electrically interfaced with one of the communication channels (130). The conductive elements (186) at the distal end (181) of each wire cable are electrically interfaced with a different first physical connector (141, 142, and 143) which includes one or more power channels and may include one or more wired communication channels. Each cable (180) enters the cable gland (183) from outside the enclosure side wall (172) and the cable shielding layer and the electrically insulating cable outer covering the shielding layer are gripped by the cable gland (184) in a manner that electrically grounds the cable shielding layer to a corresponding enclosure sidewall (172) and secures the distal end to the cable gland. A similar cable gland (184), cable and enclosure wall interface is disclosed in commonly owned U.S. patent application Ser. No. 15/081,461 entitled Cable Gland Assembly by Long et al. filed on Mar. 25, 2016, which is hereby incorporated herein in its entirety for all purposes.

Communication Network

Referring now to FIG. 1 the power manager (100) includes a communication network (130). The communication channel (130) includes one or more network or similar communication interface devices (114) and a plurality of communication channels interconnecting various internal devices and modules to the digital data processor (120) for digital communication. The communication channel (130) optionally includes additional network communication interface devices (114) operable to communicate with other power managers, e.g. over a peer-to-peer network, as well as to gain access to a Wide Area Network (WAN), e.g. over a cellular network interface device, and or to communicate with WAN based devices such a policy server, authentication module or the like, operating on one or more WAN based servers. Each wireless network interface device (114) is configured to receive communication signals configured in a first communication protocol structure and to translate the first communication protocol signals to a second communication protocol structure as needed to facilitate communication between devices configured to use different communication protocols. The communication channels also may extend between internal modules of the power manager (100) without passing over the digital data processor (120) and may include analog channels for exchanging analog signals including power signals. Each device port (141, 142, and 143) is connected with the digital data processor (120) over at least one communication network channel. Accordingly when an external power device is connected with any one of the device ports the external DC power device joins the communication network established by the communication interface device (114) for communication with the digital data processor (120).

The communication channel (130) optionally includes a variety of communication channel types, e.g. using different network protocols, suitable for digital data communications. The communication channel types may include analog signal conductors or the like for exchanging analog signals between electronic modules operating on the power manager (100). The communication channel (130) is primarily a wired communication network housed inside the enclosure (170). Wireless communication channels are optionally provided such that in some embodiment's wireless communication channels are usable to communicate with external DC power devices or with other power managers and with network devices reachable on a Wide Area Network (WAN).

The various communication channel types may include one or more of a wired network using a wire network communication protocol, e.g. the IEEE 802.3 wired Local Area Networks (LAN) protocols which include Ethernet and Power over Ethernet (POE), System Management Bus (SMBus), Universal Serial Bus (USB), Recommended Standard 232 (RS232), or the like. The various communication channel types may include wireless networks based on any one of the IEEE 802.11 Wireless Local Area Network (WLAN) protocols which include Wi-Fi, Bluetooth, or any one of the IEEE 802.11 WLAN protocols, and one or more cellular network protocols e.g. 3G, 4G, LTE, etc.

Additionally, the communication channel (130) may include conductive paths, wires or the like, for exchanging analog or digital signals between electronic components of the power manager such as various switches, sensors, and power converters and the digital data processor (120). In particular, the communication channel (130) extends from the digital data processor (120) to each controllable element of the power manager (100) including switching elements (253, 255, 257, 259, 261), the DC power bus sensor (112), other power sensors (210, 211, and 212) and power converters (220, 221) to deliver control signals thereto and to receive sensor signals, or the like, therefrom. The control signals include configuration and setting instructions for operating each controllable element to receive and distribute power according to the energy management schema. The communication channels extending to device ports may comprise a one-wire identification interface configured to enable the digital data processor (120) to query a connected external power device (161, 162, and 163) for power characteristics information.

Power Manager Battery

The power manager (100) includes an optional internal rechargeable battery (116). If present, the internal battery (116) provides power to the digital data processor (120). The internal battery is a rechargeable battery (116) that can be charged when the power manager (100) is operably connected to a power source or external battery capable of providing charge. The internal battery (116) provides power to digital data processor (120), enabling the functioning of the power manager (100), when power sufficient for operation of the power manager is not available from a power source or rechargeable battery connected to a device port (161, 162, 163).

Alternatively, power sensors (210, 212) are operable to detect an operating voltage and or input power available from a connected external power source or rechargeable DC battery without any communication with the external device and to use the available input power to operate the digital data processor (120) or recharge the internal battery (116).

Primary Power Channel

Figure 4:
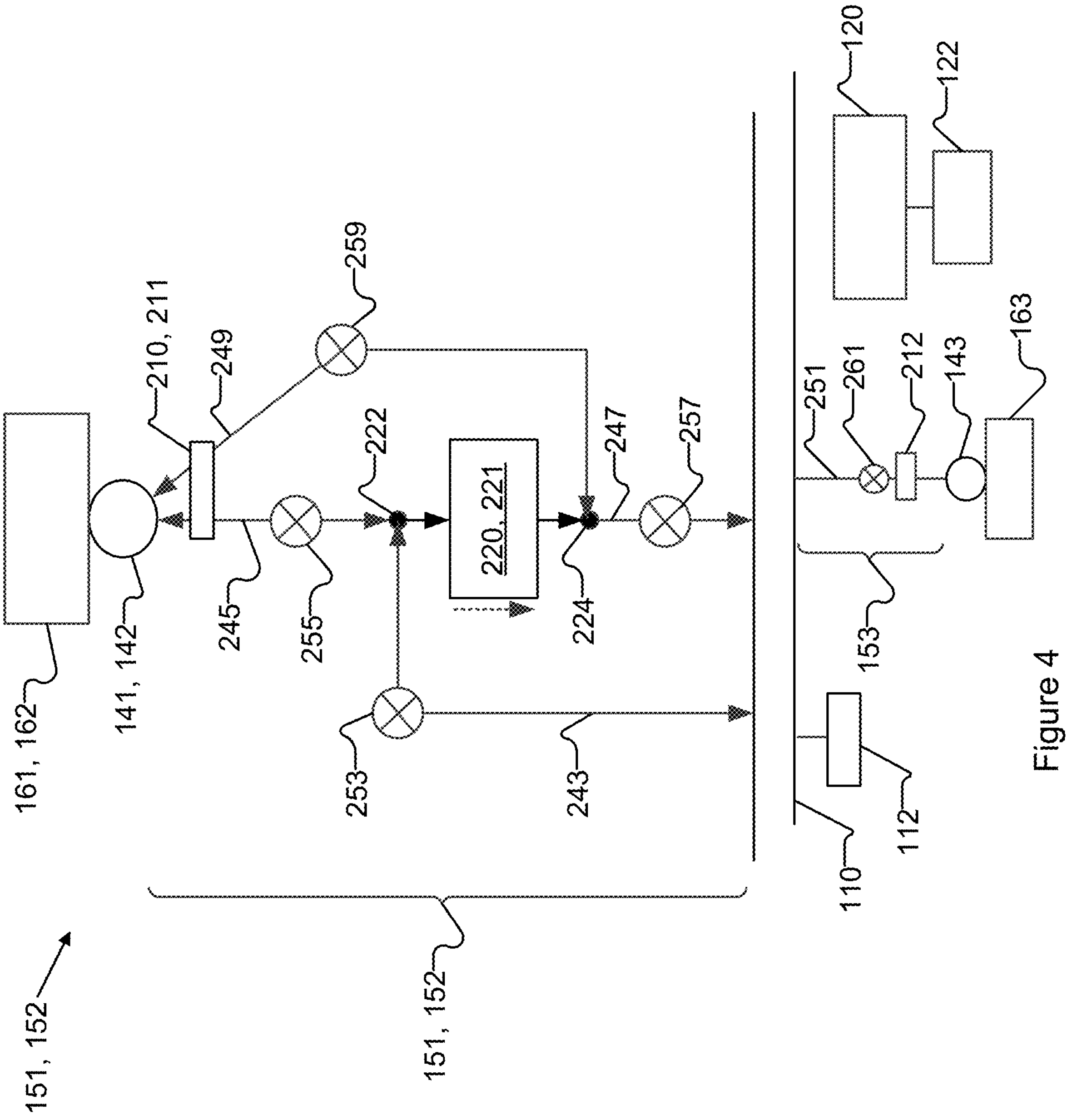
FIG. 4 depicts an exemplary schematic diagram of a non-limiting exemplary power manager according to one aspect of the present invention.

Referring now to FIGS. 1 and 4, power manager (100) includes a primary device port (143) which is electrically connectable to a primary external DC power device (163) and a DC power bus (110). The primary external DC power device (163) is any external DC power device that can be connected to any one of the primary device port (143) or the secondary device ports (141) or (142). The primary power channel (153) includes only one power channel extending from the primary device port (143) to the DC power bus (110) and is configurable a as bi-directional power channel operable as an input power channel or as an output power channel without voltage or power conversion and without current attenuation.

Primary power channel (153) includes a bidirectional conductor or primary leg (251) that extends between primary device port (143) and DC power bus (110) and allows current flow either from the primary external DC power device (163) to the DC power bus (110) or from the DC power bus (110) to the primary external DC power device (163). A primary configurable switch (261) is disposed along primary leg (251) between the primary device port (143) and DC power bus (110). Digital data processor (120) is in communication with primary configurable switch (261) over the communication channel (130) and is operable to send control signals to the primary configurable switch (261). Digital data processor (120) can set primary configurable switch (261) in an open position to block flow of current over the primary leg (251) or in a closed position to allow an input power signal to pass from primary device port (143) to DC power bus (110) or to allow an output power signal to pass from power bus (110) to the primary external DC power device (163) over the primary device port (110), thereby connecting primary external DC power device (163) to DC power bus (110).

Primary power channel (153) optionally includes a primary channel power sensor module (212) associated with primary device port (143) and in communication with digital data processor (120) over the communication channel (130). The primary channel power sensor module (212) is configured to measure power characteristics of power signals passing over the primary power channel (153) including one or more of instantaneous power amplitude, instantaneous voltage amplitude, and instantaneous current amplitude and to report amplitude measurement results to digital data processor (120).

Reconfigurable Converter Power Circuit

Referring now to FIGS. 1 and 4-7 the power manager (100) further includes at least one and in the present embodiment two converter or secondary device ports (141, 142) each of which is electrically connectable to a secondary external DC power device (161, 162). Each secondary external DC power device (161, 162) is any external DC power device that can be connected to any one of the primary device port (143) or the secondary device ports (141) or (142). Each reconfigurable power circuit (151, 152) extends between a different converter or device port (141, 142) and the DC power bus (110). Each reconfigurable power circuit (151, 152) is independently operated by the digital data processor (120) as needed to transfer power between a connected secondary external DC power device (161, 162) and the DC power bus (110) or to transfer power from the DC power bus (110) to the connected secondary external DC power device (161, 162). Each converter device port (141, 142) includes a communication channel, operably connectable to an external secondary DC power device (161, 162) interfaced therewith. The communication channel is part of the communication channel (130), which enables communications between the digital data processor (120) and each of the secondary external DC power device (161, 162) interfaced with a converter device port (141, 142).

The reconfigurable converter power circuits (151, 152) each include one or more secondary power channels or conductors that extends from a different converter or secondary device port (141, 142) to the DC power bus (110). Each secondary power channel includes a different one-way DC to DC power converter (220, 221) disposed between a corresponding device port and the DC power bus. Each reconfigurable converter power circuit (151, 152) includes power channel circuitry that is configurable to provide any one of a one-way power converting input power channel (232), shown in FIG. 6, a one-way power converting output power channel (230), shown in FIG. 5, and a bidirectional power channel (234), shown in FIG. 7 wherein the bidirectional power channel (234) is usable as an input power channel or an output power channel without voltage conversion.

Each reconfigurable converter power channel (151, 152) includes a different converter circuit power sensor module (210, 211). Each converter circuit power sensor module is disposed proximate to a corresponding converter device port (141, 142) in order to sense power characteristic of power signals either entering or exiting the converter device port (141, 142). Each converter circuit power sensor module is in communication with the digital data processor (120) and is operable to measure power characteristics of a bidirectional power signal including one or more of instantaneous power, instantaneous voltage, and instantaneous current and to report measurement results to the digital data processor (120).

Each controllable one-way DC to DC voltage or power converter (220, 221) includes an input terminal (222) and an output terminal (224). Each DC to DC power converter (220, 221) is one-way because a power signal can only be power converted or current modulated when the power signal is directed from the input terminal (222) to the output terminal (224). Specifically, a power signal entering through the input terminal (222) is power converted and or current modulated according to power conversion and amplitude modulation settings received from the digital data processor (120). The power converted output signal exiting output terminal (224) has one of a different voltage or a different current amplitude, or both and may have a different total power amplitude as compared to the input power signal.

The DC to DC power converter (220) can be configured to convert in input signal voltage to a different output signal voltage by either stepping the input voltage up or stepping the input voltage down as required to adjust the output signal voltage exiting from the output terminal (224) to a desired voltage amplitude. Optionally the DC to DC power converter is further configured to modulate the current amplitude of the input power signal as required to adjust the output signal current amplitude exiting from the output terminal (224) to a desired current amplitude. Generally the power converter operates to modulate current amplitude passing over the power converter between substantially zero and a maximum available current amplitude, i.e. the entire instantaneous current amplitude of the input signal is passed through the power converter without modulation.

In an exemplary operating mode, the digital data processor (120) determines if an external DC power device connected to a converter or secondary device port (161, 162) is a DC power source, a rechargeable DC battery, or a DC power load, either by communicating with the external DC power device to determine a device type and other information such as the operating voltage range, state of charge, or the like, or by determining an instantaneous voltage based on a sensor signal received from the converter circuit power sensor module (210). Once the device type and voltage requirements of the device are determined the energy management schema operating on the digital data processor makes a determination about whether to connect the external power device to the DC power bus or not and further makes a determination about how to configure the relevant reconfigurable circuit (151, 152) to make the connection.

Each reconfigurable converter power circuit (151, 152) includes four configurable switches (253), (255), (257), and (259). Each configurable switch is operable to direct a power signal over a desired conductive flow path or to prevent the power signal from flowing over the conductive flow path. Digital data processor (120) is in communication with each of the four configurable switches via the communication channel (130) and is operable to send an independent control signal to each switch. Each configurable switch (253, 255, 257, and 259) can be toggled to an open (off) position, to prevent current flow across the switch or toggled to a closed (on) position to allow current flow across the switch. Similarly the configurable switch (261) used in the primary power channel (153) can be toggled to an open (off) position, to prevent current flow across the switch or toggled to a closed (on) position to allow current flow across the switch.

In an exemplary embodiment, configurable switches (253, 255, 257, and 259) of the reconfigurable power circuits (251, 253) and the configurable switch (261) of the primary power channel (153) are single pole single throw type switches. Alternatively, the switches can be implemented with multiple throws, multiple poles. The switches can include Field Effect Transistors (FETs), e.g. MOSFETs, Power FETs, e-MOSFETs, etc.

Referring to FIGS. 4-7, each reconfigurable converter power circuit (151, 152) includes multiple power channels (230, 232, and 234) each comprising multiple converter channel legs (243, 245, 247, and 249). As shown in the Figures, bidirectional current flow over each leg is indicated by solid double-headed arrows, e.g. as shown on the primary power channel (153) and one-way current flow over each leg is indicated by solid single headed arrows, e.g. as shown on converter power circuit (230). Converter device port (141, 142), DC power bus (110), switches (253, 255, 257, and 259) and one-way DC to DC power converter (220) are interconnected by the converter channel legs (243, 245, 247, and 249) to provide various current flow paths or circuit configurations as may be required to distribute power to or receive power from an external converter power device connected to a secondary device port.

Reconfigurable converter power circuits (151, 152) are configurable to transfer power signals between converter or secondary device ports (141, 142) and the DC power bus (110) in either direction i.e., from converter device port (141, 142) to DC power bus (110) or from DC power bus (110) to converter device port (141, 142) with or without power conversion by configuring the state of each of the configurable switches (253, 255, 257, and 259) in patterns of open and closed positions and by configuring the state of each DC to DC power converter (120) for power converting or non-power converting modes. Patterns of open and closed positions and of on and off configurations are set forth in Table 1.

Figure 5:
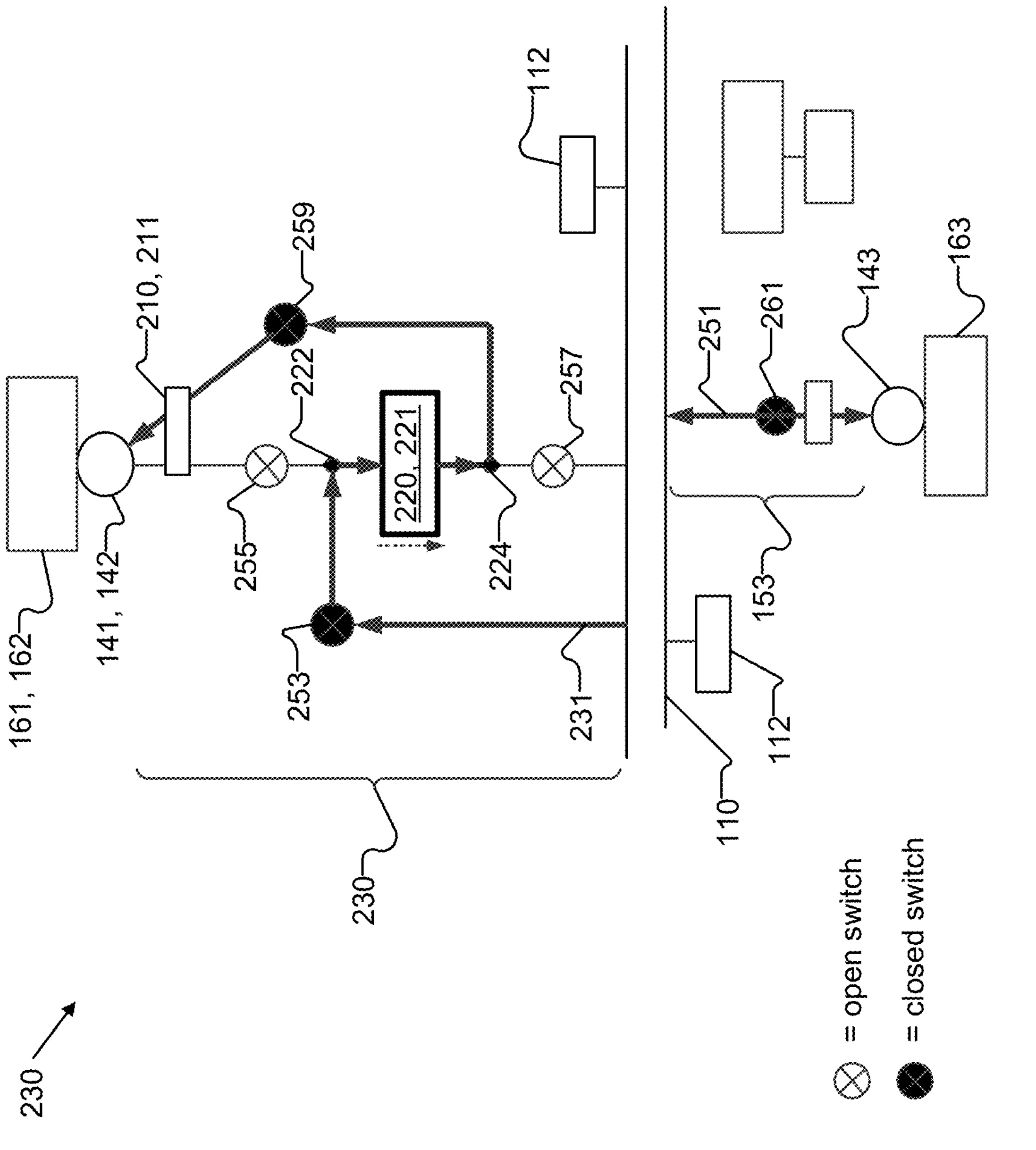
FIG. 5 depicts an exemplary schematic diagram of a non-limiting exemplary power manager according to one aspect of the present invention.
Figure 6:
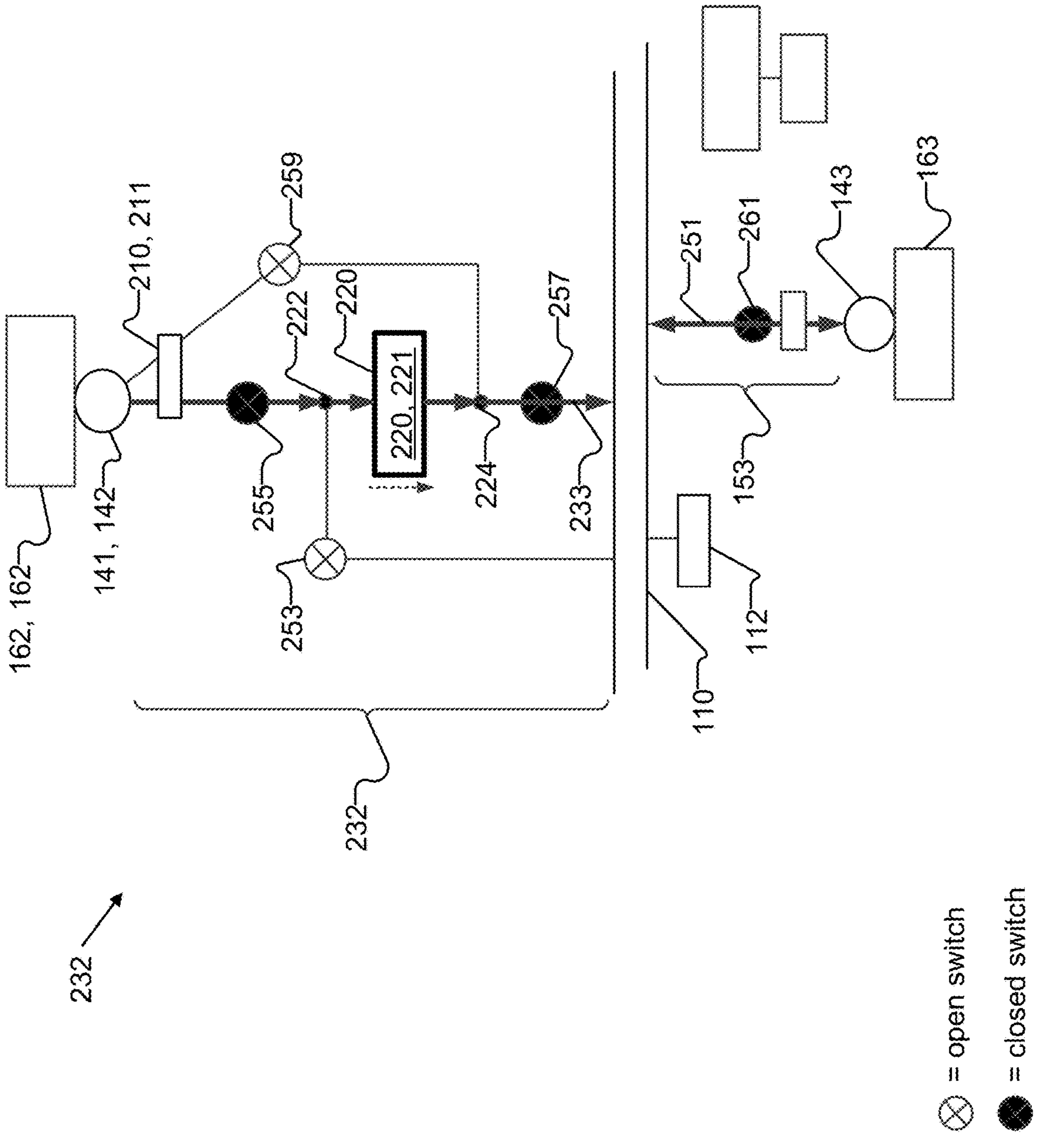
FIG. 6 depicts an exemplary schematic diagram of a non-limiting exemplary power manager according to one aspect of the present invention.
Figure 7:
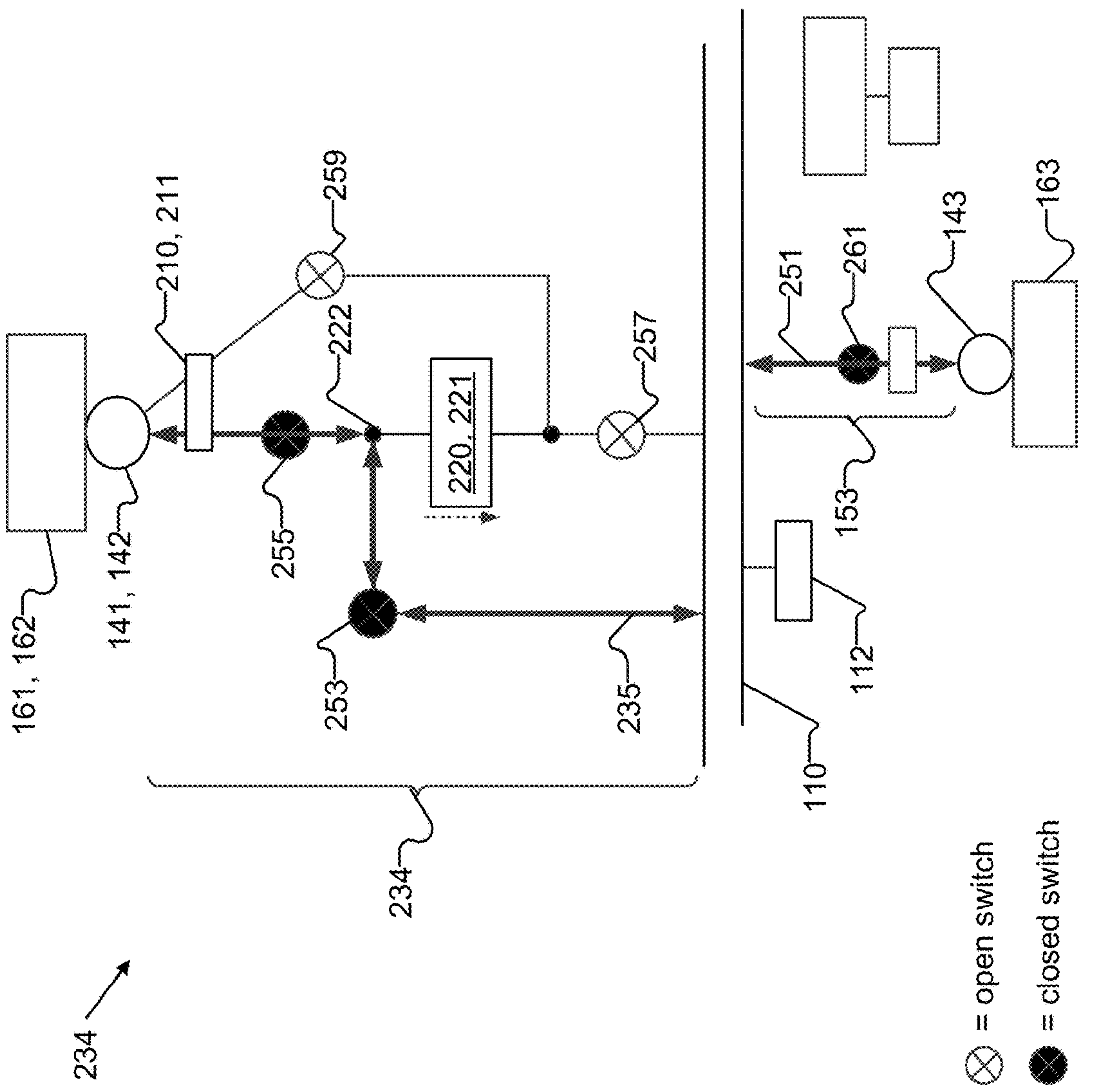
FIG. 7 depicts an exemplary schematic diagram of a non-limiting exemplary power manager according to one aspect of the present invention.

Referring to FIGS. 5, 6, and 7, patterns of configurable switch open and closed positions, power converter on and off configurations, and corresponding electrical current flow paths are shown for each of the multiple power channels (230, 232, and 234). Blackened circles represent closed switches, bolded power converter (220) outlines represent "on" state of the power converter, and bolded arrows represent active converter channel legs, i.e. channel legs over which electrical current can flow given the specified patterns of open and closed switch positions and power converter setting.

Primary power channel (153) is configured as an input/output power channel by closing primary configurable switch (261). In this case an input power signal received from a primary external DC power source or rechargeable battery connected to the primary device port (143) is directed to the DC power bus (110) without power conversion. Likewise when a primary external power load or rechargeable DC battery to be charged is connected to primary device port (143) an output power signal received from the DC power bus (110) is directed to primary device port (143) without power conversion.

Referring now to FIG. 5, each reconfigurable converter power circuit (151, 152) can be configured as a power converting output power channel (230) comprising power converting output conductive pathway (231) by opening switches (255) and (257), closing switches (253) and (259), and configuring the one-way DC to DC power converter (220) for the required power conversion. In this case an output power signal received from the DC power bus (110) is directed to the input terminal (222) of DC to DC power converter (220). The DC to DC power converter is configured to perform whatever voltage conversion is required to convert the output power signal to a voltage that is compatible with powering whatever secondary external DC power device is connected to the corresponding secondary device port (141, 142). Additionally if needed, the DC to DC power converter (220) can be operated to modulate current amplitude of the output power signal being voltage converted. The power converted output power signal is directed from the output terminal (224) of the DC to DC power converter (220) to converter device port (141, 142). In this configuration, power characteristics of the output power signal are monitored by the converter circuit power sensor module (210) and the power characteristics at the DC power bus (110) are monitored by the power bus sensor module (112).

Referring now to FIG. 6, each reconfigurable converter power circuit (151, 152) can be configured as a power converting input power channel (232), comprising power converting input conductive pathway (233), by closing switches (255) and (257), opening switches (253) and (259), and configuring the DC to DC power converter (220) to make the necessary voltage conversion. In this case an input power signal received from a secondary external DC power source or rechargeable battery connected to one of the device port (141, 142) is directed to the input terminal (222) of the DC to DC power converter (220). The DC to DC power converter is configured to perform whatever voltage conversion is required to convert the input power signal to a bus compatible voltage and the converted input power signal is passed to the DC power bus (110). Additionally, if needed, the DC to DC power converter (220) can be operated to modulate the current amplitude of the input power signal being voltage converted. The power converted input power signal is delivered from the output terminal (224) to DC power bus (110). In this configuration, power characteristics of the input power signal are monitored by the converter circuit power sensor module (210) and the power characteristics at the DC power bus (110) are monitored by the power bus sensor module (112).

Referring now to FIG. 7, each reconfigurable converter power circuit (151, 152) can be configured to a bus-compatible power channel (234), comprising bus-compatible conductive pathway (235), by opening switches (257) and (259), closing switches (253) and (255), and turning off one-way DC to DC power converter (220). In this configuration the power channel (234) is bidirectional such that any external power device that has a bus compatible operating voltage can be connected to the DC power bus (110) without power conversion. In the case where the secondary power device connected to a secondary device port is an external DC power source or a rechargeable DC battery having available charged stored thereon, an input power signal can be directed to the DC power bus (110) without power conversion. Conversely when the secondary power device connected to a secondary device port is an external DC power load or rechargeable battery than can accept charging power, an output power signal can be directed from the DC power bus (110) to the connected external power device without power conversion.

Table 1 includes configuration of the configurable switches and of DC to DC power converter (220) corresponding with the three configurations of the reconfigurable converter power circuits (151, 152) described above.

TABLE 1

| Reconfigurable converter power circuit (151, 152) power channel configuration | Power control element | Configuration |
|---|---|---|
| Power converting output power channel (230) (FIG. 5) | Switch 1 (255) | Open |
| | Switch 2 (253) | Closed |
| | Switch 3 (259) | Closed |
| | Switch 4 (257) | Open |
| | Power converter (220) | On |
| Power converting input power channel (232) (FIG. 6) | Switch 1 (255) | Closed |
| | Switch 2 (253) | Open |
| | Switch 3 (259) | Open |
| | Switch 4 (257) | Closed |
| | Power converter (220) | On |
| Bus compatible power channel (234) FIG. (7) | Switch 1 (255) | Closed |
| | Switch 2 (253) | Closed |
| | Switch 3 (259) | Open |
| | Switch 4 (257) | Open |
| | Power converter (220) | Off |
| Initial State | Switch 1 (255) | Open |
| | Switch 2 (253) | Open |
| | Switch 3 (259) | Open |

TABLE 1-continued

| Reconfigurable converter power circuit (151, 152) power channel configuration | Power control element | Configuration |
|---|---|---|
| | Switch 4 (257) | Open |
| | Power converter (220) | Off |

External Power Devices

External DC power devices can be connected to any one of the device ports described above. An external DC power device includes a primary external DC power device (163) interfaced with primary device port (143) and one or more secondary external DC power devices (161, 162), each interfaced with a different converter device port (141, 142). External power devices include DC power loads, DC power sources and rechargeable DC batteries. Rechargeable DC batteries can be used as a DC power source during discharge or as a DC power load or charging load during charging. Generally a DC power load has minimum power amplitude or minimum power load required to operate the power load. In addition the DC power load characteristics may include a peak power load required during some operating states. For DC power loads, the energy management schema is configured to at least allocate the minimum power and if the instantaneous power available from the DC power bus does not provide at least the required minimum power load the DC power load is not connected to the power bus. Otherwise each power load connected to a device port is connected to the power bus and allocated at least the minimum power load.

In some instances, a DC power load includes a rechargeable battery installed therein and it is the rechargeable battery that is interfaced to a device port and not the power load. In this case the energy management schema classifies the connected power device as a rechargeable battery and manages power allocation to the rechargeable battery and not to the power load.

For DC power sources, and rechargeable DC batteries that have a favorable state of charge (SoC) the energy management schema is configured to select the best available power source or rechargeable DC batteries to power the DC power bus and to connect at least one power source to the DC power bus, however two or more power sources can be connected to the power bus at the same time. In a particular configuration, two or more power sources are connected to the power bus at the same time and a current of the power bus is an aggregate of a current of each of the connected power sources. For rechargeable DC batteries that have an unfavorable state of charge, these devices are treated as charging loads and the energy management schema is operable to direct any unallocated power, e.g. not allocated to a DC power load, to one or more rechargeable DC batteries that have an unfavorable state of charge. However in this case there is no minimum power allocation for a charging load.

More generally, the digital data processor and energy management schema operating thereon are operable to select which external power devices to connect to the DC power bus or to disconnect from the DC power bus e.g. after communicating with the external power device or in response to changes in the power network. Additionally the digital data processor and energy management schema are operable to deliver power to or receive power from any one of the external DC power devices connected to any one of the device ports as warranted by instantaneous characteristics of the power network. As such the power manager and all the connected external DC power devices comprise a power network for exchanging power from one external power device to another while also consuming power to operate the components of the power manager and due to power losses due to power conversions being performed by the DC to DC power converters. Moreover, the power network can be changed when a user disconnects one external DC power device and replaces it with another. Additionally as charging power is delivered to connected rechargeable DC batteries and or removed from connected rechargeable DC batteries the state of charge of each connected DC battery is changed thereby changing instantaneous power conditions of the entire power network.

External DC power sources can include any source of DC power, for example: a solar blanket or fuel cell; a vehicle battery or the like; a wind, water, or mechanical driven power generator; an AC power grid source connected to a device port over an external AC to DC power convertor; a DC power source connected to a device port over an external DC to DC power convertor; or the like, as long as the input DC power voltage is either compatible with the instantaneous DC voltage of the DC power bus or can be converted to a bus compatible voltage by one of power converters of the reconfigurable converter power circuits (151, 152).

Power loads can be connected to the DC power bus (110) to receive power therefrom as long as the power load is either compatible with the instantaneous DC voltage of the DC power bus or can be converted to a bus compatible voltage by one of power converters of the reconfigurable converter power circuits (151, 152). Typical power loads include a DC power device such as most battery operated or DC powered portable devices, such as computers, audio systems including hand held radios, telephones or smart phones, other telecommunications equipment, instruments including navigation systems, weapons, systems, night vision and other photo sensing devices, medical devices, power tools, DC lighting, vehicle power loads, or the like.

Rechargeable DC batteries can be connected to the DC power bus (110) to receive power therefrom or deliver power thereto as long as rechargeable battery voltage is either compatible with the instantaneous DC voltage of the DC power bus or can be converted to a bus compatible voltage by one of power converters of the reconfigurable converter power circuits (151, 152). A rechargeable DC battery can be discharged to the DC power bus as a power source or charged by the DC power bus (110) when unallocated power is available therefrom.

As noted above the DC voltage of the DC power bus is matched to the operating voltage of whatever external DC power device is connected to the primary device port (143). Thus according to one aspect of the present invention a user can connect a DC power source to the primary device port to receive all the source input power without power conversion in order to avoid power converting an input power source and therefore avoiding power conversion losses due to power converting the input power source.

Exemplary Operating Modes

The following Examples of operational modes are provided to illustrate certain aspects of the present invention and to aid those of skill in the art in practicing the invention. These Examples are in no way to be considered to limit the scope of the invention in any manner.

First Exemplary Operating Mode

In a first exemplary, non-limiting operating mode, at least two external DC power devices (161, 162, 163) are connected to device ports of a power manager (100) but the device ports are not yet connected to the power bus (110) over a corresponding power circuit (151, 152, 153).

Figure 8:
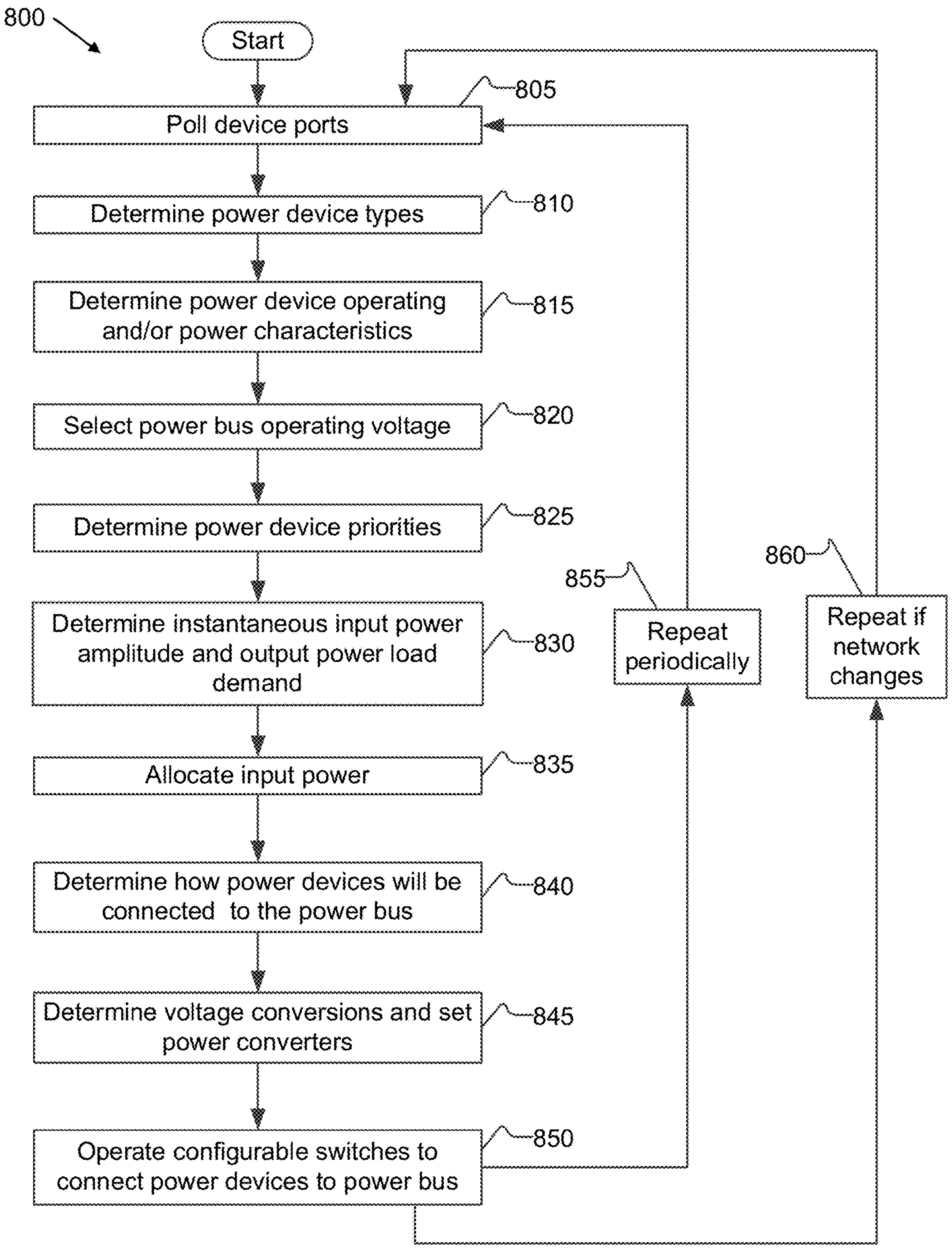
FIG. 8 depicts an exemplary flow diagram depicting a non-limiting exemplary power manager operating mode according to one aspect of the present invention.

Referring now to FIG. 8, in a step (805) the digital processor (120), according to an energy management schema program operating thereon, polls each device port using communication channels (130) to determine if an external power device is connected to the device port.

In a step (810) the digital data processor determines a device type for each external DC power device connected to a device port.

In a step (815) the digital data processor determines an operating voltage range and other operating and or power characteristics of each external DC power device connected to a device port.

In one non-limiting operating mode related to steps (805) through (815), the device type and the other power characteristics of each external DC power device (161, 162, 163) are read from digital data stored on the external DC power device or stored on a smart cable or other digital data processor or data storage device reachable by the digital processor (120).

In another non-limiting operating mode related to steps (805) through (815), the device type and the other power characteristics are determined at least in part from information obtainable from one or more device port sensors (210, 211, 212) and/or from information stored on the memory module (122). In one example operating mode the device type and other power characteristics are based on device port sensor information such as signal voltage, current amplitude, and/or power amplitude measurements which can be measured without connecting the device port to the power bus. In addition the energy management schema is operable to compare the device port sensor information with power characteristics of various external DC power device types that are stored in a look-up table, or the like, on the memory module (122). As a result of the comparison of the sensor information and look-up table data the energy management schema can determine a device type and the power characteristics of the external DC power device without reading digital data from the connected external power device.

In a step (820) the digital data processor (120) uses the energy management schema to select an operating voltage of the DC power bus (110). In all cases where an external power device (163) is connected to the primary device port (143), the operating voltage of the DC power bus (110) is matched to the operating voltage of the primary external DC power device (163). In cases where there is no primary external DC power device (163) connected to the primary device port (143), a power network is still established as long as the power network includes at least two secondary external DC power devices (161, 162) with each DC power device connected to a different secondary converter device port (141) or (142). However if a power network is not established or if a more efficient configuration is available, an error message may be generated by the digital data processor to instruct a user to connect at least one external DC power device to the primary device port.

In a step (825) the digital data processor (120), using the energy management schema, determines a device priority, if any, for each external DC power device. The device priority may be read from the external power device or may be assigned by the energy management schema according one or more default priority settings and/or instantaneous network conditions.

In a step (830) the digital data processor (120) determines the instantaneous input power amplitude and the instantaneous output power load demand of the present power network.

In a step (835) the digital data processor (120) allocates available input power to one or more power loads connected to a device port and allocates any unallocated power to charge one or more rechargeable DC batteries connected to a device port.

In a step (840) the digital data processor (120) determines how each external DC power device will be connected to the DC power bus, e.g. over the primary power channel, or over one leg of one of the reconfigurable power channels (151, 153).

In a step (845) the digital data processor (120) determines any voltage conversions that need to be made in order to connect each secondary power device (161, 162) to the DC power bus (110) and sets appropriate voltage conversion settings for each of the DC to DC power converters (220, 221).

In a step (850) the digital data processor (120) operates one or more of the configurable switches (261) on the primary power channel (153) and or (253, 255, 257, and 259) on the reconfigurable power channels (151, 151) as required to connect appropriate external DC power devices to the power bus over one or more selected circuit legs and or to disconnect appropriate external DC power devices from the power bus as required to allocate power according to the power allocation plan established by the energy management schema.

In a step (855) the above described steps are repeated at a configurable refresh rate, for example a refresh rate of 20 to 100 msec with the exception that during the initial state prior to repeating step (805) some or all of the device ports are already connected to the DC power bus (110), the type and power characteristics of each external power device and the operating voltage of the DC power bus (110) already may be known and some or all of the switch positions and DC to DC power conversion settings can be maintained if warranted by the present state of the power network.

In a step (860) the above described steps are repeated whenever there is a change in the network configuration, e.g. when a user physically connects an external DC power device to or disconnects an external DC power device from the power manager (100) or if the power bus sensor module (112) detects a low bus voltage condition that is below a threshold operating DC power bus voltage.

As noted above, an external DC power load is allocated the full power load demanded thereby unless the full power load allotment is not available. When the full power load allotment is not available, the external DC power load is disconnected from the DC power bus if it was already connected, or the external DC power load is not connected to the power bus if it had not been previously connected.

Also as noted above: each external rechargeable DC battery is characterized either as a power source, from which stored energy is drawn to power the DC power bus (110), or as an energy storage device, to which energy is delivered to increase the state of charge of the rechargeable DC battery. However unlike power loads, rechargeable DC batteries can be charged without allocating full charging power, e.g. they can be trickle charged. In other words rechargeable batteries can be charged with whatever level of unallocated power amplitude is available, as long as the available power amplitude does not exceed the batteries' maximum charging rate.

Thus the energy management schema operates to determine instantaneously available input power amplitude from all external DC power sources and/or rechargeable DC batteries that are connected to a device port and to determine an instantaneous output power demand or load required to meet the full power load of all DC power loads connected to a device port. Thereafter the energy management schema operates to allocate a full power load to as many DC power loads as can be powered by the instantaneously available power. Once all or as many of the power DC loads that can be powered have been allocated full power, all external DC power loads that did not receive a power allocation are disconnected from the power bus (110). Thereafter if there is any unallocated power left over, the unallocated power is distributed to one or more rechargeable batteries, if any, that are connected to device ports. Additionally, when there is insufficient input power available from a power source to power high priority power loads, the energy management schema is operable to discharge one or more rechargeable DC batteries connected to device ports in order to power the high priority power loads. In other words when additional input power is required to power DC power loads, rechargeable DC batteries are used as a DC power source by discharging one or more rechargeable DC batteries to the DC power bus in order to power DC power loads connected to device ports. Additionally, the energy management schema is operable to discharge one or more rechargeable DC batteries connected to device ports in order to charge other rechargeable batteries connected to device ports, e.g. to level the state of charge of all the rechargeable batteries connected to device ports.

To select a power bus operating voltage, the digital data processor (120) polls the primary device port (143) to gather power characteristics of a connected primary power device (163). The digital data processor then sets an operating voltage of the DC power bus (110) to match the operating voltage of the primary external DC power device (163). In one example embodiment, the digital data processor (120) queries a look up table or the like stored in the associated memory module (122). The look-up table lists a plurality of discreet DC bus voltage operating voltages, including a default bus voltage operating voltage. The digital data processor then selects an operating voltage of the DC bus from the list of discreet operating voltages with the selected discreet operating voltage most closely matched to the operating voltage of the primary external DC power device (163).

The preselected list of bus voltage operating points is chosen to match the operating voltage ranges of standard primary external DC power devices (163) that are commonly used with the power manager. In one non-limiting example embodiment, the power manager is designed for military use and includes operating voltage ranges typical of hand held or man-portable military devices and portable military batteries. Such man-portable devices may include radios, computers, navigation systems, and instruments each having an operating voltage range centered on any one of 6, 12, 24, 30, and 42 VDC. The operating voltage ranges of the DC to DC power converters (220, 221) are selected to provide voltage conversion over the operating voltage ranges of the standard primary external DC power devices (163) that are commonly used with the power manager which in the present non-limiting example embodiment is a voltage range of between 5 and 50 VDC; however different voltage ranges, including larger ranges, are usable without deviating from the present invention.

More specifically, in an exemplary embodiment, any external DC power device having an operating voltage range with its mid-point that falls between 5 and 50 volts DC can be connected to the DC power bus over any of the device ports (141, 142, and 143). In a preferred embodiment the power converters (220, 221) are configured for making power conversions over a voltage range of 5 to 50 VDC. Thus with the DC bus voltage set to 5 VDC the power converters are capable of converting the 5 VDC bus voltage to any voltage in the range of 5 to 50 VDC at each secondary device port. Similarly with the DC bus voltage set to 50 VDC, the power converters are capable of converting the 50 VDC bus voltages to any voltage in the range of 5 to 50 VDC at each secondary device port. In other embodiments, the power manager (100) can be constructed to operate at other bus voltage ranges depending on the application and the availability of appropriate DC to DC power converters.

Exemplary Operating Mode for a First Network Configuration

Still referring to FIG. 8 and steps (805) through (860), during steps (805)-(815) the digital data processor (120) determines that a primary external DC power device (163) interfaced with a primary device port (143) is a DC power source with an operating voltage approximately centered on 24 VDC, that a secondary external DC power device (161) connected to converter device port (141) is a rechargeable DC battery with an operating voltage approximately centered on 12 VDC, and that a secondary external DC power device (162) connected to converter device port (142) is a DC power load having an operating voltage approximately centered around 32 VDC.

In steps (820) and (825) the energy management schema sets the power bus DC operating voltage at 24 VDC and determines that the DC power source connected to the primary device port (143) has the highest source priority and that the DC power load connected to device port (142) has the highest load priority.

In steps (830) and (835) the energy management schema determines the instantaneous input power available from the DC power source connected to device port (143) as well as the instantaneous input power available from the rechargeable DC battery connected to the device port (141). The energy management schema determines the instantaneous power load being demanded by the DC power load connected to the device port (142) and based on the State of Charge (SoC) and energy storage capacity of the rechargeable DC battery connected to the device port (141) determines an instantaneous power load associated with the rechargeable DC battery. Thereafter the instantaneous input power is allocated first to the DC power load connected to device port (142) because the DC power loads has the highest load priority, and second to recharge the rechargeable DC battery connected to device port (141). If the instantaneous input power amplitude meets or exceeds the instantaneous power load being demanded by the DC power load, the full instantaneous power load being demanded by the DC power load is allocated. If not, no power is allocated to by the DC power load connected to the device port (142). If the instantaneous input power amplitude exceeds the instantaneous power load being demanded by the DC power load, the excess unallocated power is allocated to recharge the rechargeable DC battery connected to the device port (141). If the instantaneous input power amplitude is less than the instantaneous power load being demanded by the DC power load, no power is allocated to the DC power load and the instantaneous input power amplitude is fully allocated to recharge the rechargeable DC battery connected to the device port (141). In cases where neither solution is workable, e.g. when the instantaneous input power amplitude exceeds the power demand on the network or may damage the network, the instantaneous input power is rejected and a new solution is attempted, e.g. to use the rechargeable DC battery connected to the device port (141) to power the DC power load connected to the device port (142).

In steps (840)-(850) the energy management schema determines a connection scheme for connecting each device to the DC power bus (110) according to the power allocation scheme. Along the primary power channel (153) the switch (261) is closed to connect the primary device port (143) and the connected DC power source to the power bus. This step powers the DC power bus at 24 VDC as provided by the 24 VDC power source connected to the primary device port (143).

The reconfigurable power channel (152) is configured as shown in FIG. 5 by opening switches (257) and (255) and closing switches (253) and (259). The DC to DC power converter (220) is set to receive an input power signal from the DC power bus at 24 VDC and to step the input power signal up to 32 VDC in order to power the 32 VDC power load connected to the device port (142).

The reconfigurable power channel (151) is also configured as shown in FIG. 5 by opening switches (257) and (255) and closing switches (253) and (259). The DC to DC power converter (221) is set to receive an input power signal from the DC power bus at 24 VDC and to step the input power signal down to 12 VDC in order to recharge the 12 VDC rechargeable battery connected to the device port (141).

If at any time, the 12 VDC rechargeable DC battery connected to the device port (141) is used as a power source to allocate input power to the power bus, the reconfigurable power channel (152) is reconfigured as shown in FIG. 6 by opening switches (253) and (259) and closing switches (255) and (257). The DC to DC power converter (221) is set to receive an input power signal from the rechargeable DC battery connected to the device port (141) at 12 VDC and to step the input power signal up to 24 VDC in order to deliver input power to the power bus (110).

In a further exemplary operating example, each of the DC to DC power converters is operable to modulate current amplitude of a power signal passing through the DC to DC power converter. In particular the current amplitude of a power signal entering the power converter input terminal (222) may be passed through the DC to DC power converter substantially unmodulated, i.e. at full current amplitude, of substantially fully modulated, i.e. substantially zero current amplitude.

Exemplary Operating Mode for a Second Network Configuration

Still referring to FIG. 8 and steps (805) through (860), during steps (805)-(815) the digital data processor (120) determines that a primary external DC power device (163) interfaced with a primary device port (143) is a DC power source with an operating voltage approximately centered on 24 VDC, that a secondary external DC power device (161) connected to converter device port (141) is a rechargeable DC battery with an operating voltage approximately centered on 24 VDC, and that a secondary external DC power device (162) connected to converter device port (142) is a rechargeable DC battery with an operating voltage approximately centered on 24 VDC.

In steps (820) and (825) the energy management schema sets the power bus DC operating voltage at 24 VDC and determines that the DC power source connected to the primary device port (143) has the highest source priority and that each of rechargeable DC batteries connected to device ports (141, 142) have an equal load priority.

In steps (830) and (835) the energy management schema determines the instantaneous input power available from the DC power source connected to device port (143) as well as the instantaneous input power available from each of the rechargeable DC batteries connected to the device ports (141, 142). The energy management schema determines the instantaneous power load being demanded by each of the rechargeable DC batteries connected to the device ports (141, 142), e.g. based on the State of Charge (SoC) and energy storage capacity of each rechargeable DC battery connected to the device port (141, 142). Thereafter the instantaneous input power may be equally divided between the two rechargeable DC batteries, may be fully allocated to one or the other of the two rechargeable DC batteries, or may be partially allocated to each of the two rechargeable DC batteries in unequal portions.

In steps (840)-(850) the energy management schema determines a connection scheme for connecting each device to the DC power bus (110) according to the power allocation scheme. Along the primary power channel (153) the switch (261) is closed to connect the primary device port (143) and the connected DC power source to the power bus. This step powers the DC power bus at 24 VDC as provided by the 24 VDC power source connected to the primary device port (143).

The reconfigurable power channels (151, 152) are both configured as shown in FIG. 7 by opening switches (257) and (259) and closing switches (253) and (255). The DC to DC power converter (220) of each circuit (151, 152) is not in use so may be powered down.

In an alternate connection scheme, the reconfigurable power channels (151, 152) are both configured as shown in FIG. 5 by opening switches (255) and (257) and closing switches (253) and (259). In this case the DC to DC power converter (220) is set for no voltage change and is still usable to attenuate current without a DC to DC voltage conversion. If at any time, one or both of the 24 VDC rechargeable DC batteries connected to the device port (141, 142) is used as a power source to allocate input power to the power bus, the reconfigurable power channels (151, 152) do not require reconfiguration as long as the DC power bus operating voltage is 24 VDC.

Exemplary Operating Mode for a Third Network Configuration

Still referring to FIG. 8 and steps (805) through (860), during steps (805)-(815) the digital data processor (120) determines that a primary external DC power device (163) interfaced with a primary device port (143) is a DC power load with an operating voltage approximately centered on 12 VDC, that a secondary external DC power device (161) connected to converter device port (141) is a rechargeable DC battery with an operating voltage approximately centered on 24 VDC, and that a secondary external DC power device (162) connected to converter device port (142) is a rechargeable DC battery with an operating voltage approximately centered on 32 VDC.

In steps (820) and (825) the energy management schema sets the power bus DC operating voltage at 12 VDC and determines that the DC power load connected to the primary device port (143) has the highest load priority and that each of the rechargeable DC batteries connected to device ports (141, 142) have an equal load and an equal source priority.

In steps (830) and (835) the energy management schema determines the instantaneous input power available from each of the rechargeable DC batteries connected to device ports (141) and (142). The energy management schema determines the instantaneous power load being demanded by each of the rechargeable DC batteries connected to the device ports (141, 142), e.g. based on the State of Charge (SoC) and energy storage capacity of each rechargeable DC battery connected to the device port (141, 142). Thereafter the instantaneous input power available from one or both of the rechargeable DC batteries connected to the device ports (141, 142) is allocated to the power the DC power load connected to the primary device port (143).

In steps (840)-(850) the energy management schema determines a connection scheme for connecting each external power device to the DC power bus (110) according to the power allocation scheme. Along the primary power channel (153) the switch (261) is closed to connect the primary device port (143) and the connected DC power load to the power bus. The reconfigurable power channels (151, 152) are both configured as shown in FIG. 6 by opening switches (253) and (259) and closing switches (255) and (257). The DC to DC power converter (221) associated with reconfigurable power circuit (151) is set to receive an input power signal at 24 VDC from the rechargeable DC battery connected to the device port (141) and to step the input power signal down to 12 VDC in order to deliver input power to the power bus (110). The DC to DC power converter (220) associated with reconfigurable power circuit (152) is set to receive an input power signal at 32 VDC from the rechargeable DC battery connected to the device port (142) and to step the input power signal down to 12 VDC in order to deliver input power to the power bus (110).

In order to meet the power demand of the DC power load connected to the primary device port (143) either one of the rechargeable DC batteries connected to secondary device ports (141) and (142) can be used exclusively by connecting one or the other to the DC power bus. Alternately, in order to meet the power demand of the DC power load connected to the primary device port (143) both of the rechargeable DC batteries connected to secondary device ports (141) and (142) can be connected to the DC power bus at the same time. In cases where the instantaneous input power available from one the rechargeable DC batteries connected to the device ports (141) and (142) exceeds the DC power load demanded by the DC power source connected to device port (143) any unallocated power is directed to the other rechargeable DC batteries by reconfiguring the associated reconfigurable circuit to receive DC power from the power bus, e.g. as is shown in FIG. 5. However this action is controlled by the energy management schema by configuring reconfigurable power channels to distribute unallocated instantaneous input power to selected rechargeable DC batteries based on the state of charge and charge capacity of the connected rechargeable DC batteries. According to a further exemplary operating mode one or both of the DC to DC power converters is set to modulate current amplitude as a means of modulating instantaneous input power being delivered to the DC power bus (110). According to a further exemplary operating mode DC power is only drawn from the rechargeable DC battery having the highest instantaneous input power available. According to another exemplary operating mode DC power is only drawn from the rechargeable DC battery having the lowest instantaneous input power available.

Maximum Power Point Tracking Exemplary Operational Mode

In a further non-limiting exemplary network configuration and operating mode, a DC power load or rechargeable DC battery having a low state of charge is connected to the primary device port (143). A first high priority power source such as a renewable energy source, e.g., a solar blanket or wind turbine, or the like, that tends to have a continuously fluctuating voltage and therefore continuously variable power amplitude is connected to secondary converter device port (141). A second high-priority power source such as a renewable energy source, e.g., a solar blanket or wind turbine, or the like, that tends to have a continuously fluctuating voltage and therefore continuously variable power amplitude is connected to a secondary converter device port (0).

In one operating mode the energy management schema sets the DC bus voltage to match the operating voltage of the DC power load or of the low state of charge rechargeable DC battery and connects all of the external power device to the DC power bus using appropriate power conversion settings as described above.

In a further exemplary operating mode, the digital data processor (120) is operable to run Maximum Power Point Tracking (MPPT) algorithms to modulate input power from one or both of the high priority DC power sources connected to the converter device ports (141, 142). The MPPT algorithms are usable to convert input power from the variable voltage secondary power sources (e.g. having time varying input power amplitude) to usable power having substantially constant voltage that is compatible with the operating voltage of the DC power bus (110). The operating voltage range of the input power source can be determined either by communicating with the input power source or may be inferred from sensor signal feedback. Once the input voltage range is determined the digital data processor (120) configures the reconfigurable converter power circuit (151, 152) corresponding to the converter device port (141, 142) as a power converting input power channel (232), as shown in FIG. 6, and provides set points to the DC to DC power converter (220, 221) to match the incoming voltage to the bus compatible operating voltage. Additionally, each DC to DC power converter (220, 221) is operable to modulate input current amplitude between substantially zero throughput and full throughput. Thus, the digital data processor (120) is operable to monitor input power amplitude at the power sensor (210, 211) and to modulate power output amplitude exiting the DC to DC power converters by varying current amplitude at the DC to DC power converter (220, 221).

Standalone Reconfigurable Power Circuit

Figure 9A:
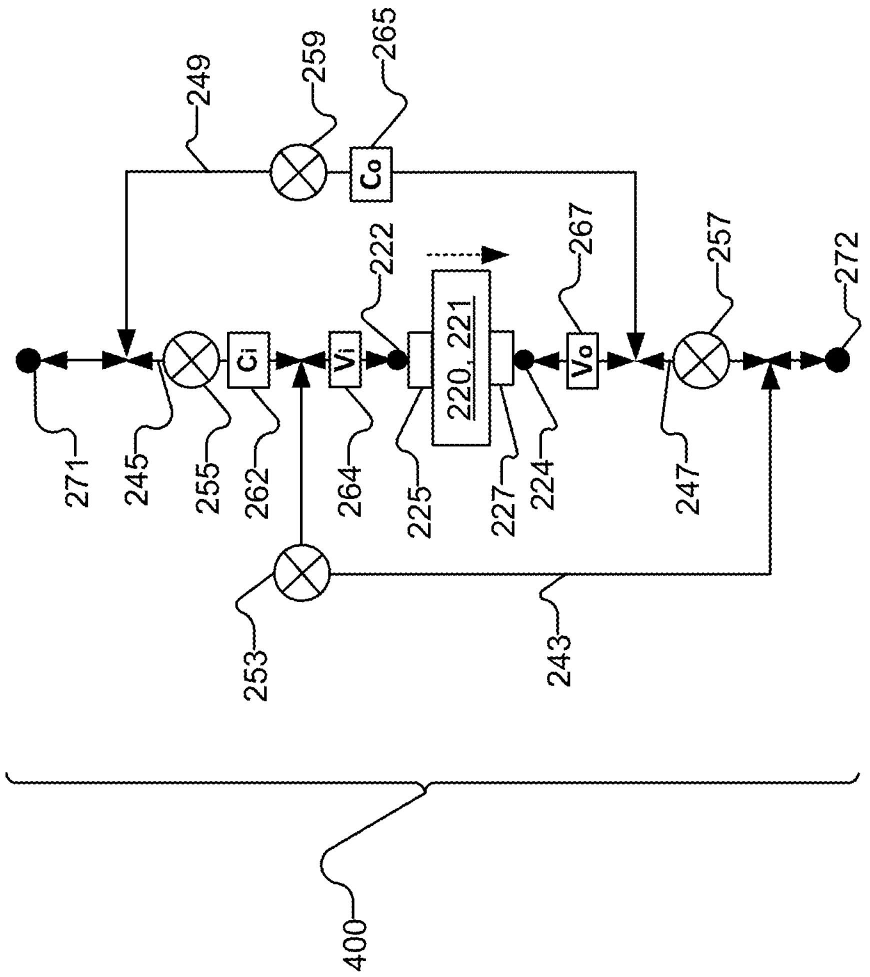
FIG. 9*a* depicts an exemplary schematic diagram of a non-limiting exemplary reconfigurable power converter circuit according to one aspect of the present invention.
Figure 9B:
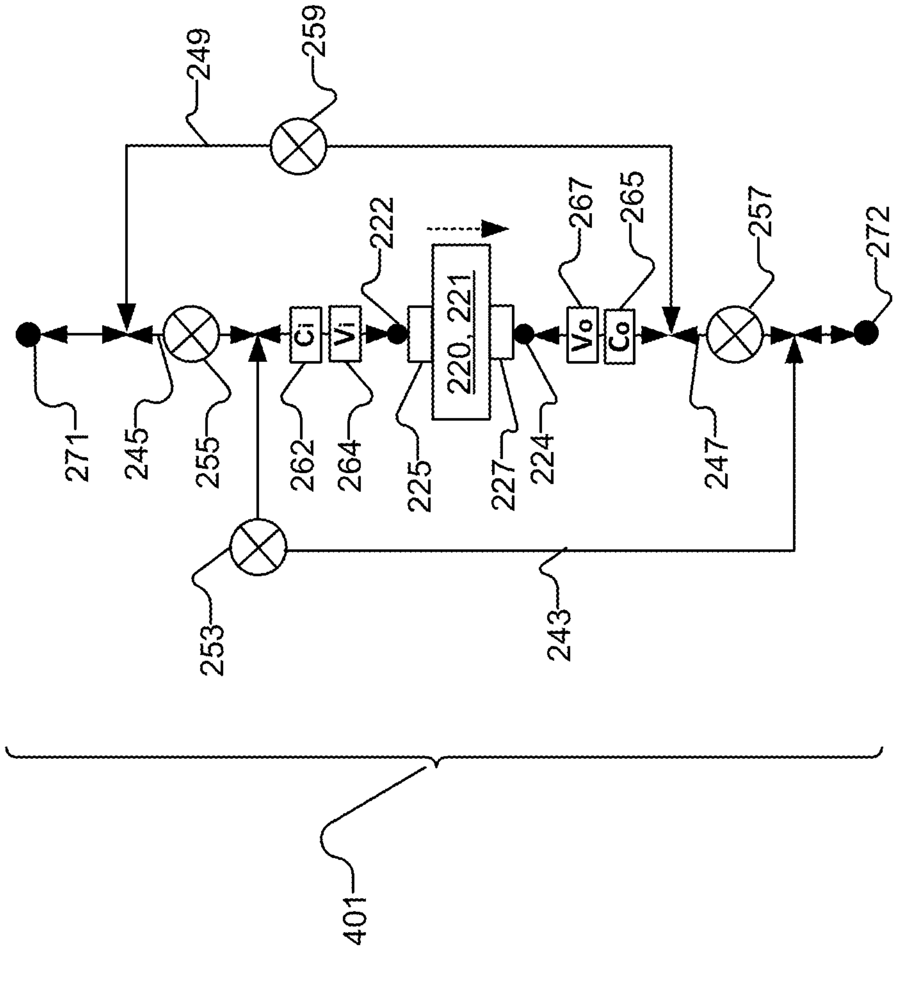
FIG. 9*b* depicts an alternative exemplary schematic diagram of a non-limiting exemplary reconfigurable power converter circuit according to one aspect of the present invention.

Referring to FIGS. 9*a* and 9*b*, an exemplary, non-limiting reconfigurable power circuit (400, 401) according to the present invention is shown in schematic view. Reconfigurable power circuit (400, 401) is similar to first and second reconfigurable converter power circuits (151, 152), shown in FIG. 4, and like components are numbered with like numbers. The reconfigurable power circuit (400, 401) includes a one-way DC to DC power converter (220), a plurality of converter channel legs (243, 245, 247, and 249) a plurality of configurable switches (253, 255, 257, and 259), a first electrical connection interface (271) and a second electrical connection interface (272). As will be further detailed below, either or both of the first and second electrical connecting interfaces described herein may be implemented as a device port or interfaced with a device port or a DC power bus. A device port is a wired connecter interface; however, a wireless power interface such as by induction is usable without deviating from the present invention.

An external DC power device is connected to a device port with a wire interface that includes a terminal connector that can be plugged into the device port. Typically, a device port connection is temporary and can be changed by a sued such as by connecting one external DC power device to the device port, e.g. to be charged, or otherwise powered, and then removing by the user and possibly be replaced by another external DC power device. A non-limiting exemplary device port embodiment is shown in FIGS. 2 and 3 and another is shown schematically in FIG. 11. In a non-limiting embodiment shown in FIG. 10 the second electrical connection interfaces (272*a*, 272*b*) each connect with a common DC power bus (110) such as by hard-wiring, or the like. In other non-limiting embodiments either one of the first or the second electrical connection interfaces (271, 272) is hardwired to a DC power device, e.g. a DC power source or rechargeable DC battery or a DC power load.

The one-way DC to DC power converter (220) includes an input terminal (222) and an output terminal (224). Current flow through the one-way DC to DC power converter (220) is directed to the input terminal by the reconfigurable power circuit and exits from the output terminal. DC to DC power conversions, when required, can be carried out by establishing an appropriate configuration of the reconfigurable power circuit (400, 401) to direct current flow to the input terminal (222, 222*a*, 222*b*). As described above and shown in FIGS. 5-7, the reconfigurable circuit can be configured as a first power converting circuit (230), shown in FIG. 5, as a second power converting circuit (232), shown in FIG. 6, or as a non-power converting circuit (234), shown in FIGS. 7 and 10.

Figure 10:
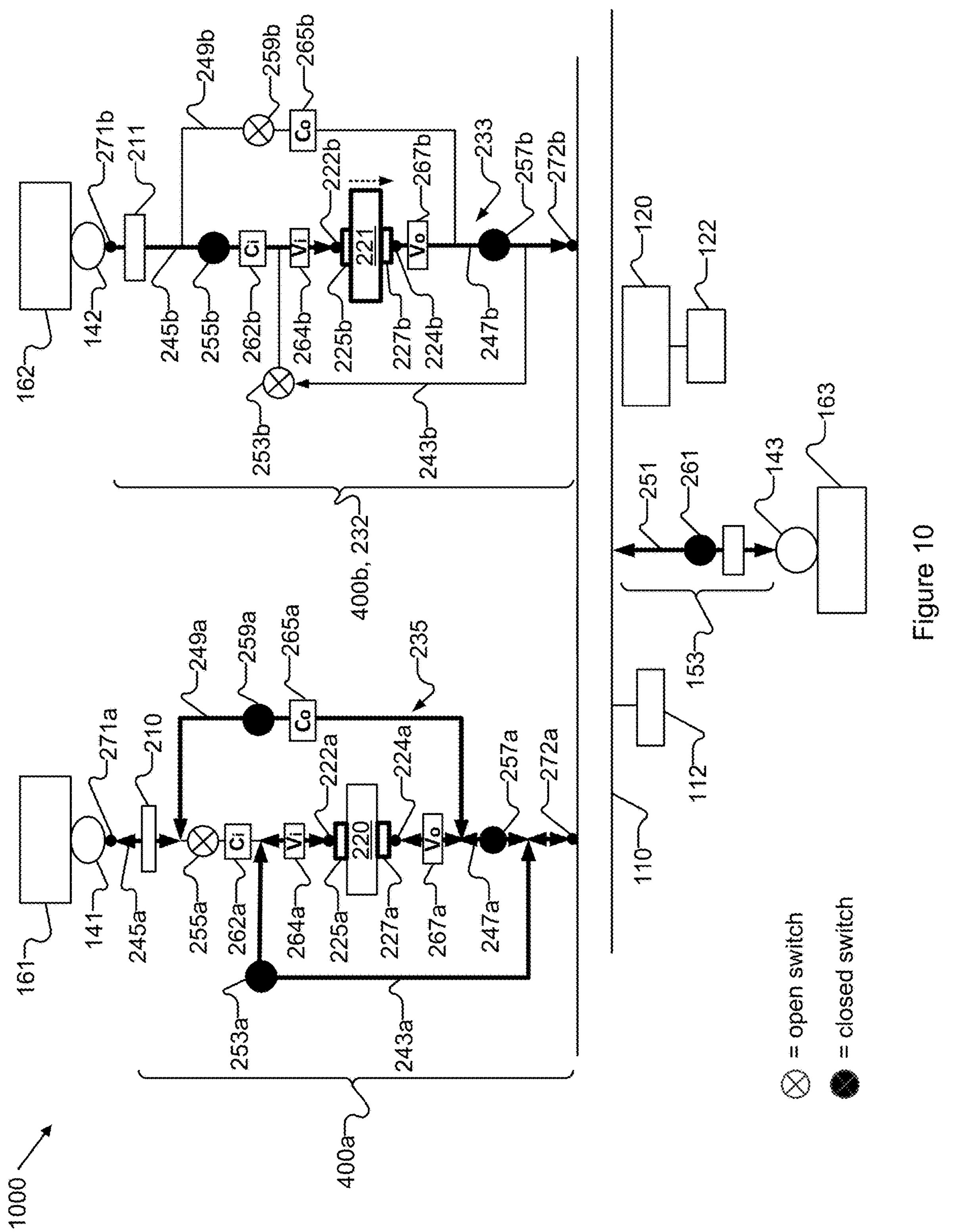
FIG. 10 depicts an exemplary schematic diagram of a non-limiting exemplary power manager that includes two reconfigurable power converting circuits according to the present invention.

FIG. 10 depicts an alternate configuration of a non-power converting circuit (400*a*) which is an alternate configuration of the non-power converting circuit (234) shown in FIG. 7. As shown in FIG. 7 the non-power converting circuit (234) is configured with the configurable switches (257, 259) both open to prevent current flow over the corresponding circuit legs (247) and (249) and with the configurable switches (253, 255) both closed to allow current flow over the corresponding circuit legs (243) and (245).

As shown in FIG. 10, the non-power converting circuit (400*a*) is configured with the with only one configurable switch (225*a*) open to prevent current flow over the circuit leg (245*a*) and thereby forcing current flow to the input terminal (222*a*). Otherwise the non-power converting circuit (400*a*) is configured with three of the configurable switches (253*a*, 257*a*, 259*a*) all closed to allow current flow over the circuit leg (243*a*) to the input terminal (222*a*), to the output terminal (224*a*) to the circuit leg (249*a*) and to the device port (141). In the non-power converting circuit (400*a*), the DC to DC power converter (220) is set with a zero-voltage conversion set point which allows current to flow through the DC to DC power converter (220) without a voltage conversion. In addition to providing a zero-voltage conversion set point to the DC to DC power converter, the energy management schema is operable to attenuate current amplitude by providing a stream of instantaneous current attenuation set points to the DC to DC power converter (220) which cause the DC to DC power converter to vary current amplitude between substantially zero current amplitude and maximum current amplitude available.

The non-power converting circuit (400*a*) of FIG. 10 provides three advantages over the non-power converting circuit (234) shown in FIG. 7. The first advantage is provided by the ability to attenuate current amplitude which allows the energy management schema to attenuate power amplitude without voltage variation. Additionally, the output current amplitude is measured by the output current sensor (265*a*) and an output current amplitude signal generated by the output current sensor is usable by the energy management schema to track output current and power amplitude. A second advantage over the non-power converting circuit (234) shown in FIG. 7 is the ability to operate the MPPT module (512), shown in FIG. 11, without voltage conversion. In a non-limiting exemplary operating mode, the non-power converting circuit (400*a*) is usable with MPPT control in situations where the input power voltage is time varying over a small range and current attenuation control is used to maintain a substantially constant output power amplitude with less voltage variation than the input voltage variability. A third advantage over the non-power converting circuit (234) shown in FIG. 7 is the ability to charge both an input bulk capacitor (222*a*) and an output bulk capacitor (224*a*) which are each described in detail below. In particular, as will be described below, charging the bulk capacitors (222*a*, 224*a*) delays voltage drops that occurring while the configuration of the reconfigurable power circuit is being changed or due to sudden voltage drops e.g. when an external DC power load is connected to the DC power bus over one of the reconfigurable circuits (400*a*, 400*b*), or the like.

According to an aspect of the present invention, one-way DC to DC power converter (220) includes input bulk capacitor (225) disposed along the first converter channel leg (245) between the input terminal (222) and each of the first configurable switch (253) and the second configurable switch (255). Alternately, input bulk capacitor (225) can be positioned inside the DC to DC power converter (220). An output bulk capacitor (227) is also disposed along the third converter channel leg (247) between the output terminal (224) and each of the third configurable switch (257) and the fourth configurable switch (259). Alternately, output bulk capacitor (225) can be positioned inside the DC to DC power converter (220). Otherwise, any bulk capacitance device or circuit that includes a bulk capacitance device that is interfaced with any one of the input terminal (222), the output terminal (224) or is incorporated inside the one-way DC to DC power converter (220), or associated with one of the configurable switches (255*a*, 257*a*, 255*b*, 257*b*) is usable without deviating from the present invention. The bulk capacitance devices are provided to prevent a sudden short-term voltage drops from disrupting power distribution.

Such short-term voltage drops may occur when the reconfigurable power circuit is being reconfigured, e.g. while switching from a primary power source to a secondary power source, when an external DC power device is unplugged from a device port, when an energy power source becomes depleted, or when the charge capacity of a rechargeable DC battery falls below a threshold value. Preferably, the capacitance of each bulk capacitor is chosen to prevent a sudden voltage drop for a short time duration. In an example, it is desirable to limit a sudden voltage drop to less than 50% of the operating voltage amplitude for a period of 10 to 100 msec. The bulk capacitors therefore delay a low power situation for long enough to prevent external power loads from failing in some manner. Mainly, the bulk capacitors are provided to prevent more than 50% voltage amplitude drops for at least long enough for the reconfigurable power circuit to reconfigure itself to bring a secondary power source on line to replace the primary power source.

In example embodiments the capacitance of the bulk capacitors is selected to correspond with providing less than a 50% voltage drop for 10-20 msec after an abrupt but temporary power loss such as may occur while switching any of the configurable switches to change the configuration of the reconfigurable circuit. In other embodiments, the capacitance of the bulk capacitors is selected to correspond with providing less than a 50% voltage drop for up to 100 msec. Other advantages of including the bulk capacitors relate to limiting power amplitude peak to valley spreads at device ports and at other electrical connection interface points associated with external power devices and or internal power devices e.g. the digital data processor, various power sensors, or the like. Additionally, the capacitance of the input and output bulk capacitors is selected to diminish voltage amplitude ripple and noise in the reconfigurable power circuit (400, 401). The reconfigurable power circuit (400, 401) includes an input current sensor module (262) disposed along converter channel leg (245) between configurable switch (255) and power converter input terminal (222). The reconfigurable power circuit (400) also includes an output current sensor module (265) disposed along, converter channel leg (249) between configurable switches (257) and (259) and power converter output terminal (224). Alternately, in the reconfigurable power circuit (401), the output current sensor module (265) is disposed along converter channel leg (247) between configurable switch (257) and power converter output terminal (224). FIGS. 9*a* and 9*b* depict the position of the input current sensor module (262) and the output current sensor (265) for two different embodiments of a reconfigurable power circuit (400, 401).

Each of the input current sensor module and the output current sensor module is in communication with a digital data processor (120) shown in FIG. 10. The input current sensor module measures and reports an instantaneous DC current amplitude along converter channel leg (245) when the reconfigurable power circuit is configured as the one-way input power converting circuit (232) shown in FIG. 6, for converting a voltage amplitude of power input received from the first electrical connection interface (271) when configurable switches (255 and 257) are both closed and configurable switches (253 and 259) are both open. The input current sensor module also measures and reports an instantaneous DC current amplitude along channel leg (243, 245) when the reconfigurable power circuit is configured as the bidirectional non-power converting channel (234), shown in FIG. 7, for a direct exchange of power between the first interface (271) and the second interface (272) when configurable switches (257 and 259) are both open and configurable switches (253 and 255) are both closed.

The output current sensor module measures and reports an instantaneous DC current amplitude along converter channel leg (247) and/or (249), depending on location, when the reconfigurable power circuit is configured as a one-way output power converting channel (230), shown in FIG. 5, with configurable switches (253 and 259) both closed and configurable switches (255 and 257) both open. The output current sensor module also measures and reports an instantaneous DC current amplitude along converter channel leg (247) when the reconfigurable power circuit is configured as the one-way power channel (232), shown in FIG. 6, when controllable switches (253) and (257) are both open and controllable switches (255) and (259) are both closed.

The reconfigurable power circuit (400, 401) optionally includes input voltage sensor module (264) and output voltage sensor module (267). The input voltage sensor module is disposed along the converter channel leg (245) between each of the controllable switches (253) and (255) and input terminal (222) and measures and reports instantaneous DC voltage proximate to power converter input terminal (222). The output voltage sensor module is disposed along power converter channel (247) between output terminal (224) and each of the switches (257) and (259) and measures and reports instantaneous DC voltage proximate to the power converter output terminal (224). Although a single input current sensor (262) and a single output current sensor (265) are illustrated in FIGS. 9*a* and 9*b*, additional exemplary embodiments of reconfigurable power circuit (400, 401) can include one or more additional current or voltage sensors. Also input and output current and voltage sensor modules can be implemented as a single power sensor module that measures and reports power amplitude.

In an example, each current sensor (262, 265), voltage sensor (264, 267), power sensor, generates a power, current or voltage amplitude signal that is received by a digital data processor (120). When the digital data processor senses a power amplitude drop that is below a low power amplitude threshold, a mitigation action is triggered. The mitigation action may include the digital data processor reconfiguring the reconfigurable power circuit to select a different input power source or to disconnect a power load, or the like.

Power Manager

Referring to FIG. 10, an exemplary, non-limiting embodiment of a DC power manager (1000) according to the present invention is shown in schematic view. The exemplary embodiment of power manager (1000) includes first reconfigurable power circuit (400*a*) and second reconfigurable power circuit (400*b*) each interfaced with a DC power bus (110). The power manager (1000) also includes a primary power channel (153) also interfaced with the DC power bus (110). The DC power manager (1000) optionally includes a bus power sensor (112) that monitors a DC voltage amplitude, a DC current amplitude or a DC power amplitude at the DC bus (110). The DC power manager (1000) further includes a digital data processor (120) and associated memory module (122).

A first device port (141) provides a first electrical connection interface (271*a*) to the first reconfigurable power circuit (400*a*). A second device port (142) provides a second electrical connection interface (271*b*) of second reconfigurable power circuit (400*b*). A second electrical connection interface (272*a*) of first reconfigurable power circuit (200*a*) and a second electrical connection interface (272*b*) of second reconfigurable power circuit (200*b*) are each electrically coupled to the DC power bus (110).

The digital data processor (120) is in communication with control elements of each of the first and second reconfigurable power circuits (400*a*, 400*b*) including current sensor modules (262*a*, 262*b*, 265*a*, and 265*b*), voltage sensor modules (264*a*, 264*b*, 267*a*, and 267*b*), one way DC to DC power converters (220, 221) and configurable switches (253*a*, 253*b*, 255*a*, 255*b*, 257*a*, 257*b*, 259*a*, and 259*b*).

Digital data processor (120) is operable to receive communication signals including measurement values from current sensor modules (262*a*, 262*b*, 265*a*, and 265*b*) and from voltage sensor modules (264*a*, 264*b*, 267*a*, and 267*b*) and to communicate command signals, e.g. instantaneous voltage conversion set points to each of the one way DC to DC power converters (220, 221) and configuration settings to each of configurable switches (253*a*, 253*b*, 255*a*, 255*b*, 257*a*, 257*b*, 259*a*, and 259*b*). The digital data processor (120) is further operable to independently configure each of the first and second reconfigurable power circuits (400*a*, 400*b*) as any one of the three different reconfigurable power circuits (230), shown in FIG. 5; (232), shown in FIG. 6; and (234), shown in FIG. 7, each of which is each described above.

As described above related to FIGS. 9*a* and 9*b*, each input current sensor modules (262*a*, 262*b*) measures instantaneous DC current amplitude on converter channel leg (245*a*, 245*b*) and reports DC input current amplitude measurement values to controller (120). Likewise, each output current sensor module (265*a*, 265*b*) measures instantaneous DC current amplitude on converter channel legs (247*a*, 247*b*, 249*a*, 249*b*), depending on location, and reports DC output current amplitude measurement values to controller (120). Each input voltage sensor module (264*a*, 264*b*) measures instantaneous DC voltage amplitude at input terminal (222) and each output voltage sensor module (267*a*, 267*b*) measures instantaneous DC voltage amplitude at output terminal (224) and reports DC input current amplitude measurement values to controller (120).

In a preferred embodiment, the voltage of power bus (110) is configured by the energy management schema to match an operating voltage of a primary power device (163) that is electrically interfaced with primary device port (143). Preferably the primary power source, such as the most reliable power source, is interfaced with the primary device port (143) in order to match the DC bus voltage with the voltage of the primary power source. This configuration is preferred because it is desirable to avoid a voltage conversion of the input power source because this can lead to larger than necessary power conversion losses. As such, a user will be advised to use the primary device port (143) as an input power port corresponding with the most reliable power source, e.g. a DC power supply or fully charged DC energy storage device. However, the primary device port (143) can be interfaced with any external DC power device type without deviating from the present invention.

Referring now to FIGS. 8 and 10, an operating process is described for the power manager (1000). In a step (805) the energy management schema polls each device port to determine if an external DC power device is connected to the device port. In step (810) the energy management schema determines a device type, e.g. whether the connected device is a power load, a power source, a rechargeable battery or other energy source. In step (815) the energy management schema determines the power characteristics of each external DC power device. For a power load, its operating voltage range in volts and its average and peak power load requirements in watts is determined. For a rechargeable battery, its state of charge, e.g. percentage full or empty, and its charge capacity, e.g. in ampere hours, is determined. For a power source, its average and peak input power capacity, in watts is determined. In step (820) the step of selecting the operating voltage for the system (1000) has a default selection which is to set the DC bus voltage to match the operating voltage of the primary device (163) connected to the primary device port (143). In Step (825) the energy management schema determines device priorities which may be included in step (815) by reading device priorities from each connected external DC power devices. Otherwise, device priorities may be dictated by the energy management schema according to one or more predetermined device priority rules or policies and or situation-based rule configuration settings. In step (830) the energy management schema determines an available input power amplitude, e.g. from more than one input power source, and an output power demand, e.g. by more than one DC power loads, according to the device power characteristics collected in step (815), and allocates the input power to one or both of the connected external DC power devices (161, 162) in step (835). The allocation step (835) preferably allocates full power demand to connected DC power loads and allocates any unallocated power to rechargeable DC batteries. In a situation wherein the input power amplitude is insufficient to meet the full power demand of one or more of the connected DC power loads, the energy management schema will, under some circumstances, use the rechargeable DC battery as a power source to supplement available power or will simply not deliver power to one or more power loads. In step (840) the energy management schema determines how power devices will be connected to the power bus (110). In various configurations step (840) includes connecting one two or all three power devices ports to the power bus (110). In step (845) the energy management schema determines voltage conversion settings corresponding with each one-way DC to DC power converter (220, 221), and in some instances, current attenuation settings for each one-way DC to DC power converter (220, 221). In step (850) the energy management schema establishes the configuration of each of the reconfigurable power circuits (400*a*, 400*b*) by operating appropriated configurable switches and selecting voltage set points as required to provide voltage conversions at either of the one-way DC to DC power converters (220, 221). As soon as the voltage set points are enforced and the configurable switches are configured, power is routed through the power manager according to the configuration selected by the energy management schema. As shown in Steps (855) and (860) the process (800) is either periodically repeated or repeated in response to a change in the power network configuration or status.

The reconfigurable power circuits (400*a*, 400*b*) provide an advantage over conventional reconfigurable power circuits because the input current sensor (262*a*, 262*b*) and/or the input voltage sensors (264*a*, 264*b*) sense actual instantaneous input power conditions and feed this information to the energy management schema. Similarly, the output current sensor (265*a*, 265*b*) and/or the output voltage sensors (267*a*, 267*b*) sense actual instantaneous input power conditions and actual instantaneous output power conditions and feed this information back to the energy management schema.

The energy management schema is thus further configured to monitor instantaneous input power conditions and instantaneous output power conditions and to implement finer grained control over power conditions than was previously achievable. In particular, the energy management schema is operable to maintain a substantially constant output voltage amplitude at each of the output terminals (224*a*, 224*b*) by altering the voltage conversion setting at corresponding one-way DC to DC power converters (220, 221). In addition, or alternately, the energy management schema is operable to maintain a substantially constant output current amplitude at each of the output terminals (224*a*, 224*b*) by altering a current attenuation setting at corresponding one-way DC to DC power converters (220, 221). In addition, or alternately, the energy management schema is operable to maintain a substantially constant output power amplitude at each of the output terminals (224*a*, 224*b*) by altering one or both of the voltage conversion setting and the current attenuation settings at corresponding one-way DC to DC power converters (220, 221).

Power Node

Figure 11:
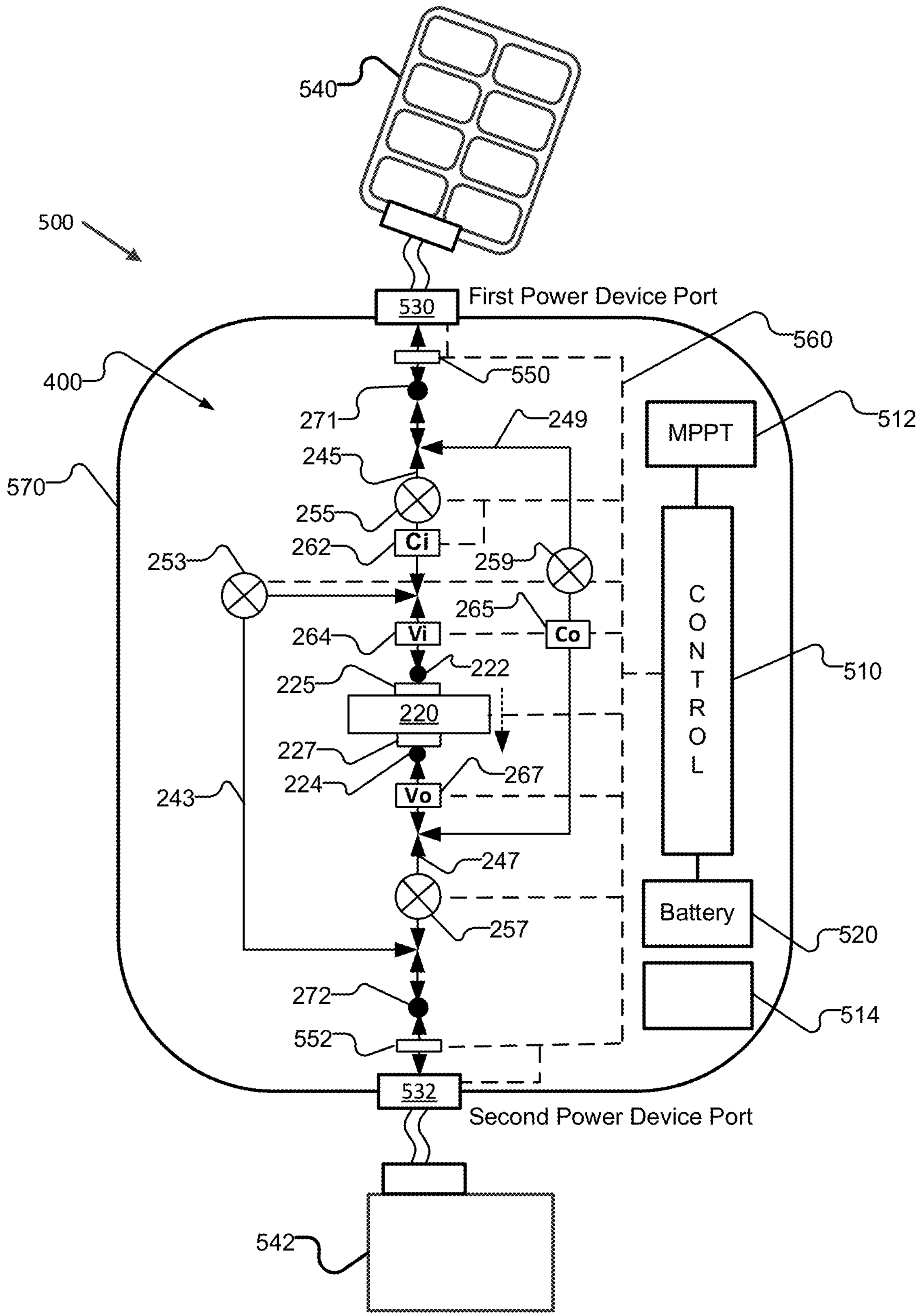
FIG. 11 depicts an exemplary schematic diagram of a non-limiting exemplary power node according to one aspect of the present invention.

Referring to FIG. 11, an exemplary, non-limiting power node (500) according to the present invention is shown in schematic view. The exemplary power node (500) includes reconfigurable power circuit (400) disposed within a power node housing (570) between a first power device port (530) and a second power device port (532). First electrical connection interface (271) is electrically coupled to the first power device port and second electrical connection interface (272) is electrically coupled to the second power device port. Each power device port (530, 532) is electrically connectable to an external power device (540, 542) by a wired interface, such as by a connector end-point shown in FIGS. 2 and 3. Each external power device (540, 542) is an external DC power device that can be connected to either the first power device port (530) or the second power device port (532). In further embodiments, one or both of the external power device ports (530, 532) are electrically connectable to a power bus architecture.

The power node (500) includes an electronic controller (510) that includes a power node digital data processor and associated power node power node memory module, therein. The power node digital data processor includes a programmable logic device operating an energy management schema program thereon and carrying out logical operations such as communicating with external DC power devices (540, 542), managing the memory module to store and recall data, reading sensor signals from voltage, current, and power sensors, and operating configurable switches and the DC to DC power converters to configure the reconfigurable power circuit according to one of the three power circuits (230, 232, 234) shown in FIGS. 5-7 of the power node.

Referring now to FIG. 11 the power node (500) includes a power node communication network (560). The power node communication network (560) is substantially similar to the previously discussed communication channel (130) of power manager (100). The power node communication network (560) includes one or more network or similar communication interface devices (514) interconnecting various internal devices and modules to the electronic controller (510) and specifically to the power node digital data processor for digital communication and or analog signal exchange. The communication network (560) optionally includes additional network communication interface devices (514) operable to communicate with other power nodes and or with remote power managers, or otherwise to gain access to various devices and services over intermediate networks, such as a wired local area network (LAN), a wireless local area network (WLAN), a peer-to-peer network, a Wireless Wide Area Network (WWAN), such as a cellular or medium range radio network, or the like. Preferable, intermediate networks provide access to a Wide Area Network (WAN) so that individual power nodes (500) can reach WAN based network devices such a policy server, an authentication or authorization server, an Identity Provider, (IdP), a Domain Name Server (DNS), or the like.

Each wireless network interface device (514) is configured to receive communication signals configured in a first communication protocol structure and to translate the first communication protocol signals to a second communication protocol structure as needed to facilitate communication between devices configured to use different communication protocols. The communication channels also may extend between internal modules of the power node (500) without interface with the power node digital data processor and may include analog channels for exchanging analog signals including sensor signals generated by various current voltage or power sensors. Each device port (530, 532) is connected with the power node electronic controller (510) e.g. with the digital data processor over at least one communication network channel. Accordingly, when an external power device is connected with any one of the device ports, the external DC power device joins the communication network established by the communication interface device (114) for communication with the power node digital data processor.

Additionally, the power node communication network (560) may include conductive paths, wires or the like, for exchanging analog or digital signals between electronic components of the reconfigurable power circuit such as various switches, sensors, and power converters and the electronic controller (510). In particular, the power node communication network (560) extends from the power node digital data processor to each controllable element of the power node (500) including configurable switches (253, 255, 257, 259), current sensor modules (262, 265), voltage sensor modules (264, 267), other power sensors (550, 552) and power converters (220) to deliver control signals thereto and to receive sensor signals, or the like, therefrom. The control signals include configuration and setting instructions for operating each controllable element to reconfigure the spinning convert circuit and establish voltage conversion and current attenuation settings at the one-way DC to DC power converter (220) as dictated by the energy management schema. The communication channels may further include a one-wire identification interface extending between the power node data processor (560) and each device port configured to enable the power node digital data processor (560) to query a connected external power device (540, 542) for power characteristics information.

Power node digital data processor is configured to communicate control signals to the one-way DC to DC power converter (220) and to the configurable switches (253, 255, 257, and 259). The power node digital data processor is configured to receive measurement signals such as a stream of instantaneous current amplitude signals from current sensor modules (262 and 269) and a stream of instantaneous voltage amplitude signals from voltage sensor modules (264 and 267). In an exemplary embodiment, power node (500) includes optional first device port power sensor module (550) operable to measure power characteristics of a power signal at first power device port (530) and an optional second device port power sensor module (552), operable to measure power characteristics of a power signal at second device port (532). The first and second device port power sensor modules are operable to report power characteristics measurement values, e.g., values of current and/or voltage, to the power node digital data processor.

The power node can include an optional internal battery (520). The internal battery is a rechargeable battery that can be charged when the power node is operably connected to a power source, to an external rechargeable battery, or to an external power bus architecture capable of providing charging power to the internal battery (520). The internal battery provides power to the power node digital data processor, for example when a power source or rechargeable battery is not connected to either of first device port (530) and second device port (532) or when external DC power devices connected to the device ports are incapable of providing power or when the power node is connected to a power bus architecture that does not provide charging power to the power node.

As illustrated in FIG. 11, first external power device (540) is electrically coupled to first device port (530) and a second external power device (542) is electrically coupled to second power device port (532). The power node digital data processor determines device type and power characteristics of each electrically coupled external power device, for example by establishing a communication session with each external power device to determine the characteristics. The power node digital data processor can also determine power characteristics of one or both power devices based on power measurement signals communicated to the power node digital data processor by the first power sensor module (550) and the second power sensor module (552). After determining external power device type and power characteristics, the power node digital data processor controls the one way DC to DC power converter and configurable switches of the reconfigurable power circuit (400) to configure the reconfigurable power circuit (400) to exchange power between the power devices connected to the external device ports. In an exemplary configuration, first power device (540) is a power source operating at a first DC voltage and second power device (542) is a power load operating at a second DC voltage that is different from the first DC voltage. The power node digital data processor configures the reconfigurable power circuit (400) as one of the three reconfigurable power configurations (230, 232, 234) shown in FIG. 57. In a first exemplary configuration, the reconfigurable power configuration (232), shown in FIG. 6, is established by the power node data processor by operating the configurable switches and setting voltage conversion and optionally current attenuation settings for the power converting input power channel to receive input power from the first external DC power device (540) at a first voltage and to deliver output power to the second external DC power device (542) at a second voltage. In a second exemplary configuration wherein the first power device (540) is a power load operating at a first voltage and the second power device (542) is a power source operating at a second voltage, different from the first voltage, the power node digital data processor configures the reconfigurable power circuit as the power converting output power channel (230) shown in FIG. 5 to receive input power from the second external DC power device (542) at the second voltage and to deliver output power to the first external DC power device (540) at the first voltage.

In a third exemplary configuration wherein each of the first external DC power device (540) and the second external DC power device (542) the same voltage and the power node digital data processor configures the reconfigurable power circuit as the bidirectional non-power converting circuit (234), shown in FIG. 7. In this operating mode, one or both of the external DC power devices can be a rechargeable DC battery that is used as a source e.g. by discharging to power a DC power load, or as a DC power load e.g. by charging the DC battery from a DC power source.

In a further exemplary embodiment, the first power device (540) includes a variable voltage power source such as, for example, a solar blanket, a wind turbine, or other fluid driven device, e.g. a water wheel and the second power device (542) includes a rechargeable DC battery or a DC power load. In this exemplary configuration, the power node digital data processor configures the reconfigurable power circuit as the one-way input power converting circuit (232) shown in FIG. 6 and operates the Maximum Power Point Tracking (MPPT) module (512), shown in FIG. 11, to implement a maximum power point tracking method while converting input power received from the variable voltage power source (540) (e.g. having time varying input power amplitude) to usable power having substantially constant output voltage that is compatible with the operating voltage of the second power device (542). The instantaneous operating voltage or power amplitude of the variable voltage input power source (540) is provided to the electronic controller (510) as a stream of voltage amplitude signals generated by the input power sensor (550).

Similarly, the instantaneous voltage at the output terminal (224) is provided to the electronic controller (510) as a stream of voltage amplitude signals generated by the output power sensor (550).

The controller (515) implements a perturb and observe (P&O) PPT process for tracking an input power amplitude as a function of an output current set point of one of the one-way DC to DC power converter (220). To find an output current set point that results in peak input power the (P&O) PPT process monitors the input power sensor (550) while incrementally varying the output current amplitude of at the DC to DC power converter (220). Thus the DC to DC power converter (220) is operated to incrementally modulate current amplitude through a range of current amplitude values while monitoring input power at the input power sensor (530). After tracking power through the selected current range a peak power operating point is selected and the selected DC to DC power converter is set to a current amplitude operating point corresponding with the peak input power level. If the input power source delivers substantially non-varying or narrowly varying input power amplitude, the DC to DC power converter may be set to the same current set point associated with maximizing input current amplitude. If the input power amplitude is temporally variable the (P&O) PPT process may be repeated, e.g. at a refresh rate. In either case the DC to DC power converter current amplitude operating point may be refreshed at the refresh rate, such as every 20 to 100 msec.

The power device ports (530, 532) of power node (500) are connectable to a power bus architecture. The DC bus architecture is operated at a DC bus voltage or voltage range which is preselected. In a further embodiment either the first or second power device port (530 or 532) is connected to a power bus architecture e.g. power bus (110) shown in FIG. 10, while the other of the first and second power device ports is connected to an external DC power device, for example a power source or power load. In an implementation, either the first or second power device port is connected to a variable voltage power source such as a solar blanket while the other device port is connected to a DC bus architecture. The power node digital data processor configures the reconfigurable power circuit to convert a voltage of a power signal received from the variable voltage source to bus compatible voltage and operates the MPPT module to control the one way DC to DC converter to modulate the amplitude of input current to maintain the power output of the variable voltage power source at an optimized range. Multiple power nodes, each substantially similar to power node (500) can be simultaneously connected to a single external power bus architecture as shown in FIG. 10, and can each receive power from the DC power bus infrastructure or deliver power to the DC power bus architecture.

In a further exemplary configuration (not shown) the first power device port (530) is electrically connected to a first power bus architecture operating a first power bus DC voltage and the second power device port (532) is electrically connected to a second power bus architecture operating at a second power bus DC voltage and the reconfigurable power circuit (400) is operable to convert the first power bus voltage to the second power bus voltage, or the convert the second power bus voltage to the first power bus voltage to autonomously interconnect the two power bus architectures and to autonomously exchange power bidirectionally between the two bus architectures as the power demand and power availability of the two bus architectures are varied.

It will also be recognized by those skilled in the art that, while the invention has been described above in terms of preferred embodiments, it is not limited thereto. Whereas exemplary embodiments include specific characteristics such as, for example, numbers of device ports, certain bus voltages and voltage ranges, power converter ranges, DC-to-DC power conversion, those skilled in the art will recognize that its usefulness is not limited thereto. Various features and aspects of the above described invention may be used individually or jointly. Further, although the invention has been described in the context of its implementation in a particular environment, and for particular applications (e.g. implemented within a power manager), those skilled in the art will recognize that its usefulness is not limited thereto and that the present invention can be beneficially utilized in any number of environments and implementations where it is desirable to selectively connect power devices to a common power bus and to manage power distributing and minimize power losses due to power conversions or other factors related to power parameters of power devices. Accordingly, the claims set forth below should be construed in view of the full breadth and spirit of the invention as disclosed herein.

What is claimed:

1. A power manager comprising:

an electronic controller;

an internal communication network including at least one communication network channel; and a first device port and a second device port, wherein the first device port is connectable to the second device port over a power pathway comprising:

a first electrical connection interface and a second electrical connection interface;

a DC to DC power converter comprising an input terminal for receiving input power at a first power amplitude and an output terminal for delivering output power at a second power amplitude;

a first power channel having a current flow path extending from the first electrical connection interface to the input terminal, through the DC to DC power converter to the output terminal, and from the output terminal to the second electrical connection interface; and at least one configurable switch, wherein the DC to DC power converter and the at least one configurable switch are each electronically connected with the electronic controller over the communication network to receive control signals therefrom, wherein said controller is configured to operate an energy management schema for determining an operating characteristic of one or more external power devices each operably connected to a one of the first and second device ports, for determining an operational configuration of the power manager, and for controlling the at least one configurable switch and the DC to DC power converter to enable the operational configuration, wherein the first electrical connection interface is electrically coupled to the first device port and the second electrical connection interface is electrically coupled to the second device port, and wherein the controller is operable to:

communicate with an external power load operatively connected to the second device port to determine power characteristics of the external power load comprising at least an operating voltage of the external power load;

determine a voltage magnitude of power available from a power source operably connected to the first device port; and configure the power pathway to provide a power signal to the external power load at a voltage compatible with the operating voltage of the external power load.

2. The power manager of claim 1, further comprising a power bus configured to operate at a bus voltage;

wherein the power pathway further comprises:

a third electrical connection interface and a fourth electrical connection interface; and a second power channel having a current flow path extending between the third electrical connection interface and the fourth electrical connection interface;

wherein the first electrical interface is electrically connected to the first device port, the second electrical interface is electrically connected to the power bus, the third electrical interface is electrically connected to the power bus, and the fourth electrical interface is electrically connected to the second device port;

wherein the first device port is operable to electrically connect a first external power device comprising a power source to the first electrical interface;

the second device port is operable to electrically connect a second external power device comprising a power load to the fourth electrical interface; and the controller is operable to determine one or more power characteristics of the power load and to configure the power pathway to provide power to the power load at a voltage and power level according to the one or more power characteristics of the power load.

3. The power manager of claim 2, further comprising:

an internal rechargeable power source for providing power when instantaneous power available from an external power source is less that an amount of power required by a power load that is operably connected to the second device port.

4. The power manager of claim 2, wherein the controller is operable to communicate with the second external power device to determine an operating voltage of the power load and to configure the first power channel to provide power received at the first device port to the power bus at a bus voltage compatible with the operating voltage of the power load; and the controller is operable to configure the second power channel to provide power to the second device port at the bus voltage.

5. The power manager of claim 4, wherein the controller is further operable to configure the power pathway to provide power received at the first device port to the second device port without voltage conversion.

6. The power manager of claim 1, wherein the electronic controller is further operable to configure the DC to DC power converter to modulate a current of a power signal provided to the second device port according to the power characteristics of the external power load.

7. The power manager of claim 1, wherein the power manager comprises one or more capacitors disposed along the power pathway for reducing electrical noise comprising the power signal provided to the external power load.

8. A power manager comprising:

an electronic controller;

a first device port electrically connected to a first electrical interface of a power pathway;

a second device port electrically connected to a second electrical interface of the power pathway;

the power pathway comprising:

the first electrical interface and the second electrical interface; and at least one control component disposed between the first electrical interface and the second electrical interface, the at least one control component comprising at least one of each of a DC to DC power converter and a controllable switch; and an internal communication network for exchanging communication signals between the electronic controller, the second device port, and the at least one control component, wherein the electronic controller is operable to:

communicate with a first external power device comprising a power load operably interfaced with the second device port to determine voltage requirements and other power characteristics of the first external power device; and communicate control signals to the at least one control component to configure the power pathway to deliver, to the first external power device, a power signal having characteristics that correspond to the voltage requirements and other power characteristics of the first external power device.

9. The power manager of claim 8, wherein the electronic controller is operable to control the DC to DC power converter to convert a voltage of a power signal received from a power source operably connected to the first device port to a magnitude of voltage that is compatible with the voltage requirements of the first external power device and to modulate a magnitude of current of the power signal.

10. The power manager of claim 8, wherein the electronic controller is operable to communicate with the first external power device over a USB communication link.

11. The power manager of claim 8, wherein the power manager comprises a single first device port, a single second device port, and single first power pathway.

12. The power manager of claim 8, further comprising a power sensor disposed along the power pathway, wherein:

the electronic controller is communicatively connected to the power sensor for receiving communication signals from the power sensor, the communication signals comprising measured power characteristics; and the electronic controller is operable to determine one or more characteristics of a power source based on the measured power characteristics and to communicate, to the one of more at least one control component, control signals based at least upon the determined one or more characteristics of the power source.

13. The power manager of claim 8, further comprising one or more dischargeable elements, wherein:

the first device port is operable to connect a second external power device comprising a power source to the power manager; and the one or more dischargeable elements are operable for reducing electrical noise of a power signal received from the power source.

14. The power manager of claim 8, wherein the electronic controller is operable to communicate with another power manager.

15. A power manager comprising:

an electrical circuit comprising:

a first electrical connection interface and a second electrical connection interface;

a switch disposed between the first electrical connection interface and the second electrical connection interface; and a power converter disposed between the first electrical connection interface and the second electrical connection interface, the power converter for receiving an input power signal at a first power amplitude and for delivering an output power signal at a second power amplitude;

a first device port electrically connected to the first electrical connection interface, the first device port for electrically connecting an external power device to the power manager;

a power sensor associated with first device port;

a controller; and a communication interface for communicating one or more characteristics of the external power device to the controller, wherein the electrical circuit is configurable to deliver the output power signal to the first device port, the output power signal compatible with the external power device, wherein the controller is configured to operate an energy management schema for determining an operating characteristic of the external power device operably connected to the first device port, for determining an operational configuration of the power manager, and for controlling the power converter to enable the operational configuration; and wherein the controller is operable to determine the operating characteristics of the external power device based on information stored in a memory accessible by the controller and to control the power converter to configure the electrical circuit to deliver the output power signal to the device port.

16. The power manager of claim 15, wherein the electrical circuit is configurable to convert a voltage of the input power signal to generate the output power signal.

17. The power manager of claim 15, wherein the power converter is configurable to modulate a current amplitude of the output power signal.

18. The power manager of claim 15, wherein the power manager comprises one or more capacitors for reducing electrical noise comprising the output power signal provided to the external power device.

19. The power manager of claim 15, wherein the power manager comprises a second device port and the second electrical connection interface is electrically connected to the second device port.

20. The power manager of claim 15, wherein the second electrical connection interface is electrically connected to a power bus architecture.

* * * * *